United States Patent [19]

McDonald et al.

[11] 4,178,479
[45] Dec. 11, 1979

[54] COMMUNICATION PROCESSOR APPARATUS FOR USE IN A TDM SWITCHING SYSTEM

[75] Inventors: John C. McDonald; James R. Baichtal, both of Los Altos; Craig D. Schaffter, Sunnyvale, all of Calif.

[73] Assignee: TRW, Inc., Los Angeles, Calif.

[21] Appl. No.: 875,495

[22] Filed: Feb. 6, 1978

[51] Int. Cl.² .................. H04J 3/12; H04Q 3/54
[52] U.S. Cl. .................. 179/15 BY; 179/15 AQ; 179/18 ES
[58] Field of Search ........ 179/15 AQ, 15 AT, 18 FC, 179/15 BY, 18 ES

[56] References Cited
U.S. PATENT DOCUMENTS 3,912,873  10/1975  Skaperda .................. 179/18 FC
4,069,399  1/1978   Barrett et al. .................. 179/15 AL Primary Examiner—Thomas W. Brown
Attorney, Agent, or Firm—Flehr, Hohbach, Test

[57] ABSTRACT

Communication processor apparatus for use in a TDM telephone system operating in a multiframe format consisting of a plurality of time frames where each time frame consists of a plurality of time slots having a time slot rate and where the plurality of frames includes signaling frames having supervisory signals where the supervisory signals occur as a signaling bit during each time slot in the signaling frame. The telephone system includes a base switch connected to a plurality of multitime slot data buses for switching encoded data between specified time slots on the buses and also includes a subscriber switch for connecting a plurality of local subscriber lines to time slots on a pair of the buses. The communication processor provides a communications link between the base switch and the subscriber switch and includes a receiver for receiving signaling bits during alternate signaling frames in the form of a message on one of the buses and a transmitter for transmitting sequential signaling bits during a selected signaling frame in the form of a second message on a multitime slot data bus. A central processing unit provides control of the operation of the communication processor.

18 Claims, 6 Drawing Figures

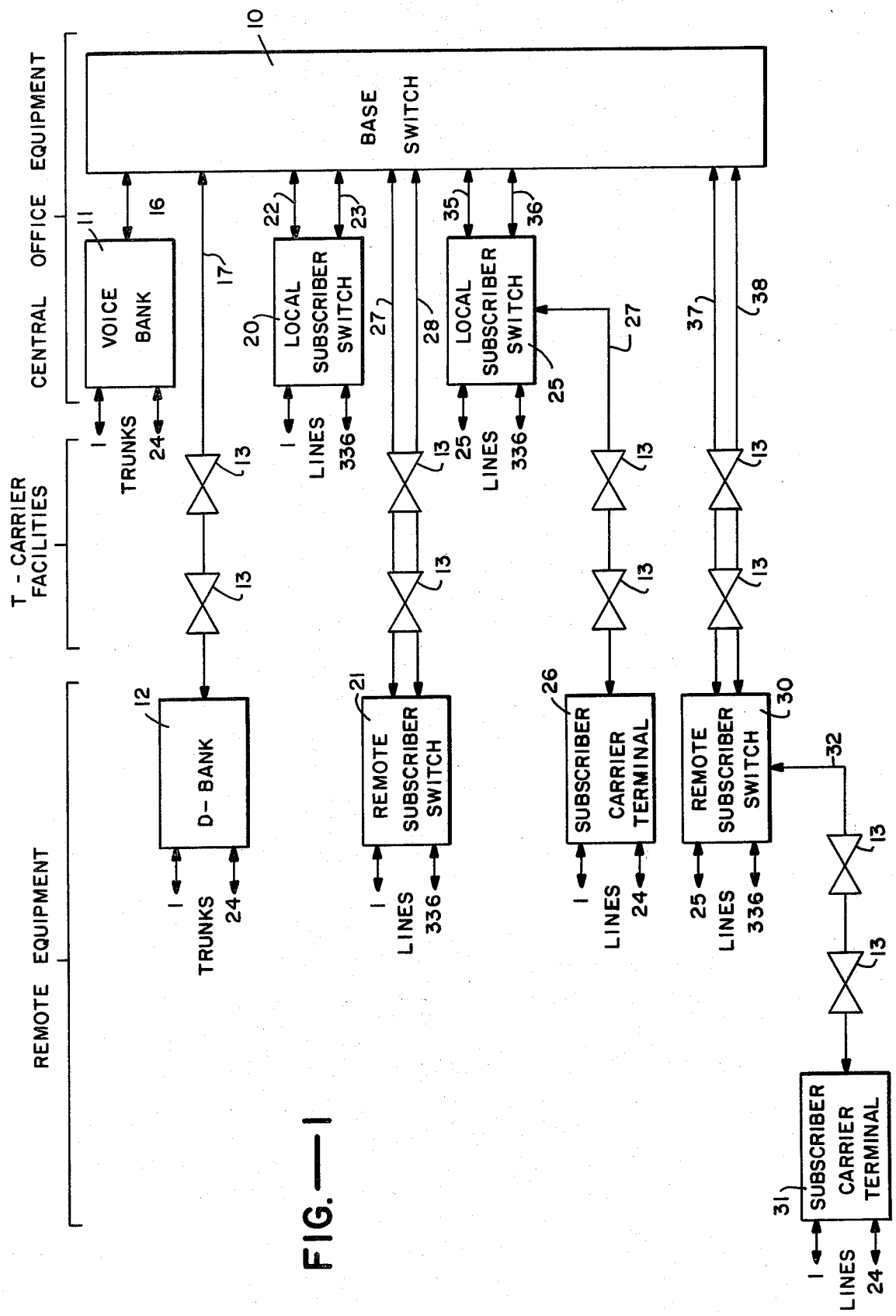
FIG.—1

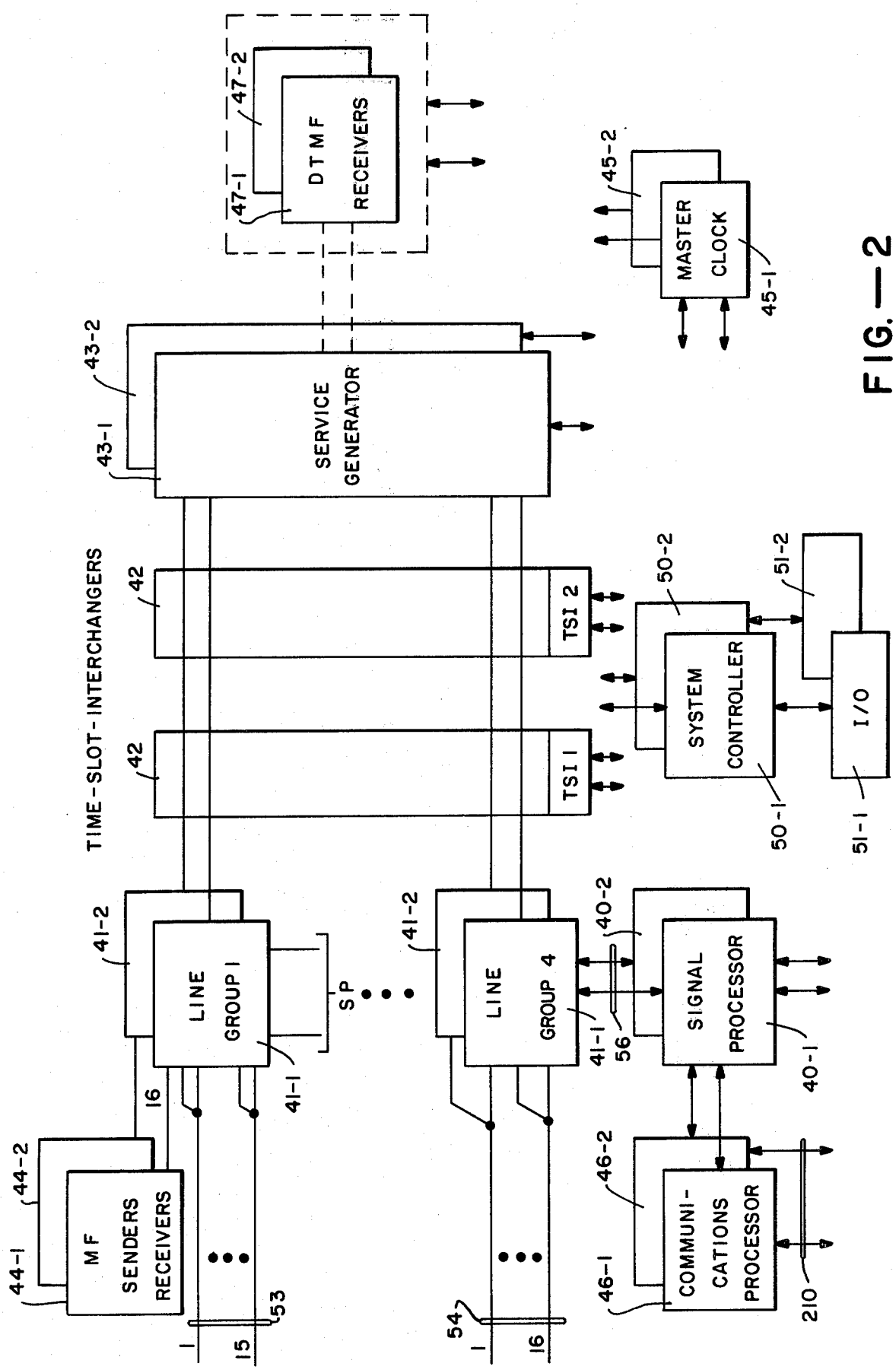
FIG.—2

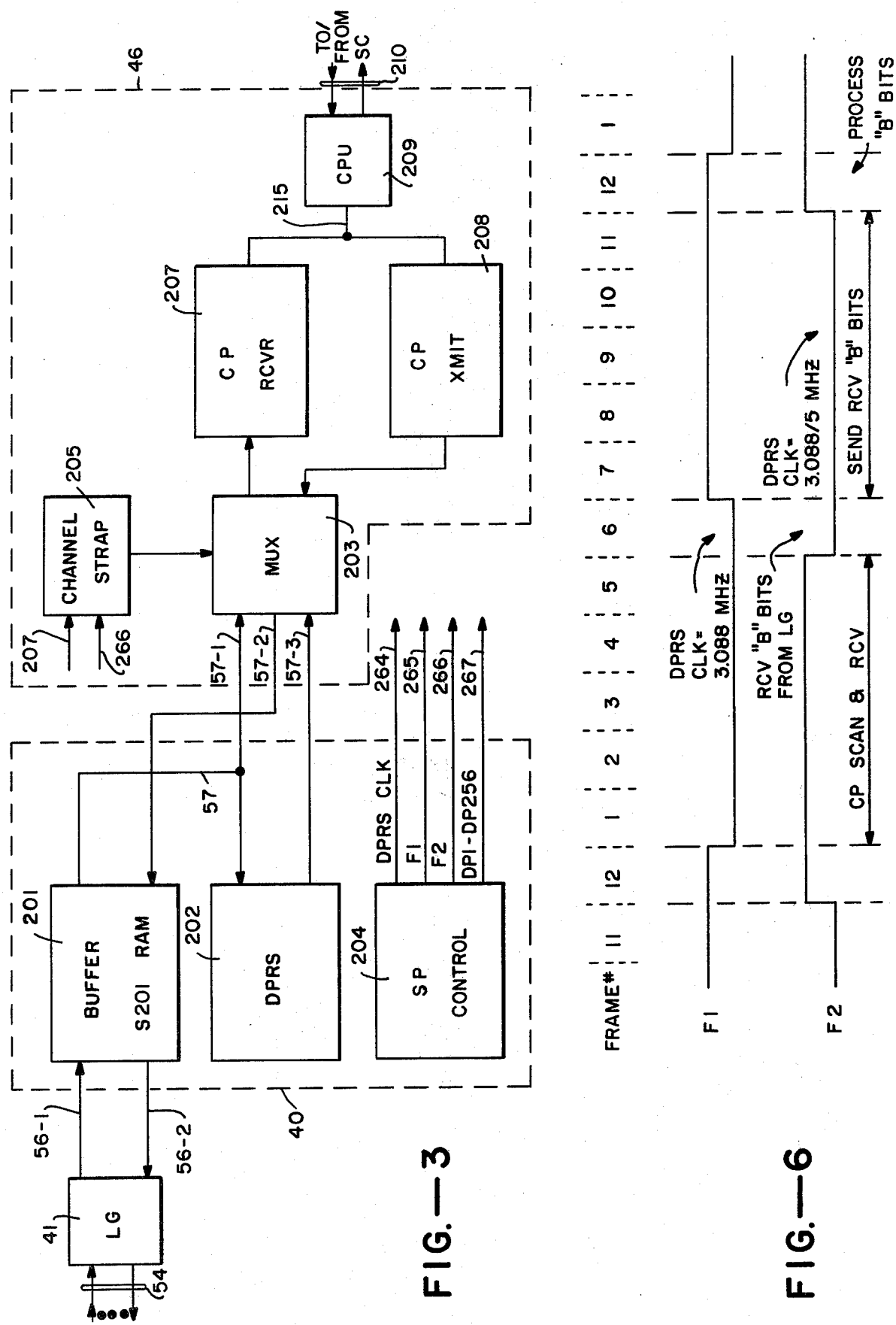

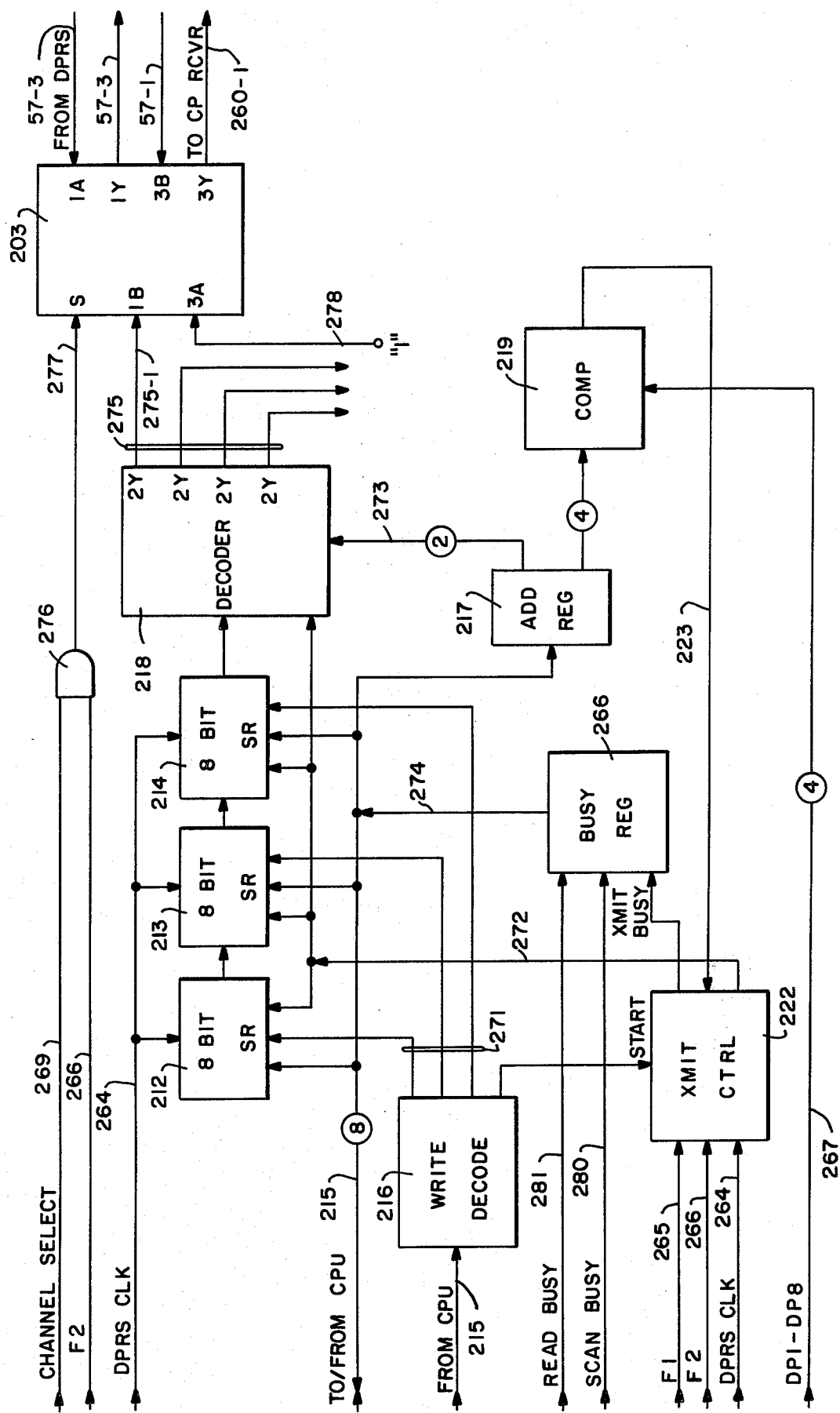
FIG.—4

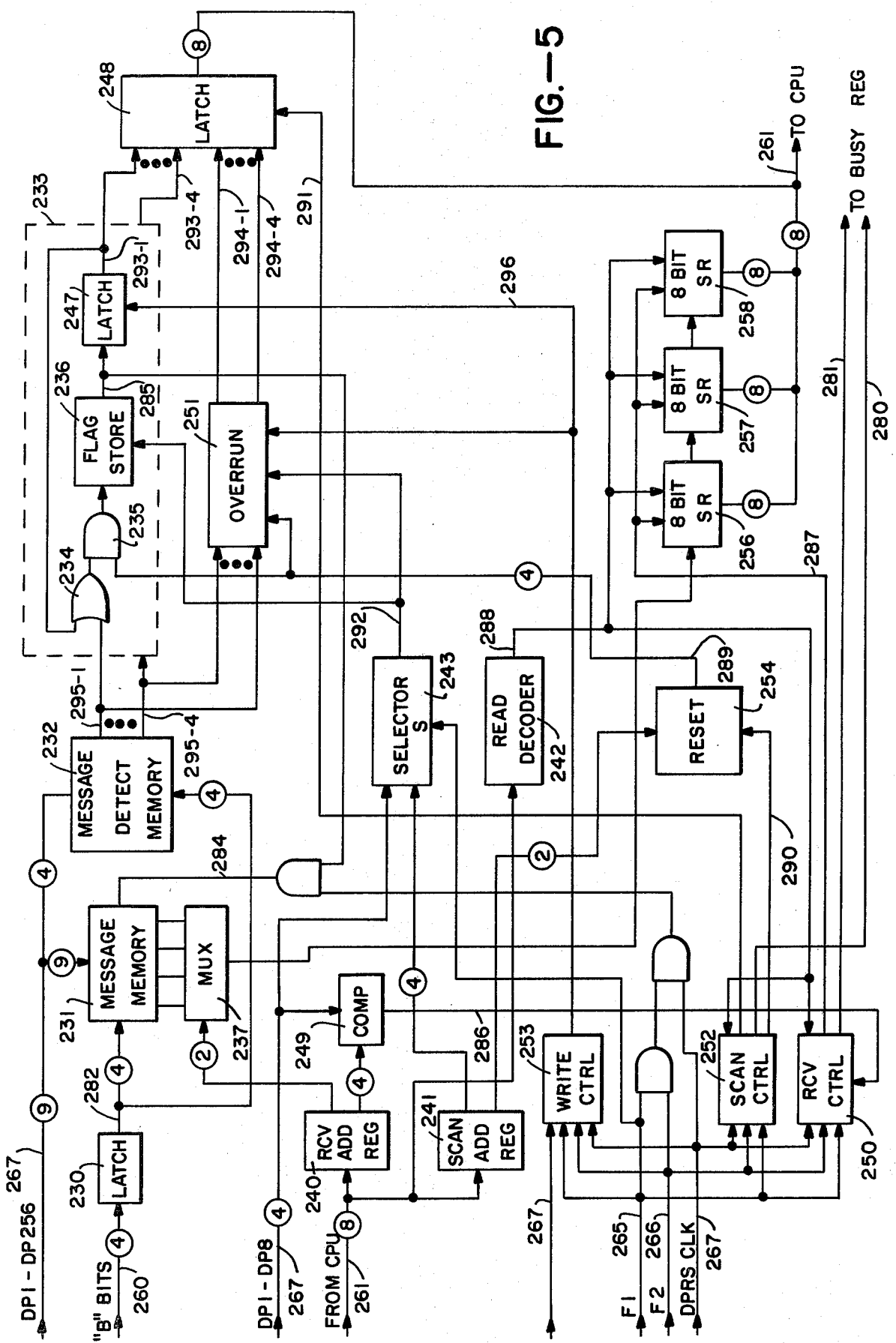

COMMUNICATION PROCESSOR APPARATUS FOR USE IN A TDM SWITCHING SYSTEM

CROSS-REFERENCE TO RELATED APPLICATIONS

1. Integrated Transmission and Switching System, Ser. No. 874,521, filed Feb. 2, 1978, invented by John C. McDonald et al, and assigned to the same assignee as the present invention.

2. Integrated Message Accounting System, Ser. No. 781,348, filed Mar. 25, 1977, invented by John C. McDonald and James R. Baichtal and assigned to the same assignee as the present invention.

3. Dial Pulse Register/Sender For A TDM Switching System, Ser. No. 762,801, filed Jan. 26, 1976, now U.S. Pat. 4,133,980, issued Jan. 9, 1979, invented by Johannes A. R. Moed and assigned to the same assignee as the present invention.

BACKGROUND OF THE INVENTION

The present invention relates to integrated transmission and switching systems and more particularly to a communications processor.

It is desirable in telephone switching systems to incorporate sophisticated integrated switching techniques to enable switching of telephone calls at a "local" level thereby enabling connections of a local subscriber line to the outside world.

Referring to the cross-referenced application entitled "Integrated Transmission and Switching System", a pulse code modulated (PCM) switching system is disclosed, having a base switch and one or more subscriber switches to enable connections between a plurality of local subscriber lines and the outside world, utilizing a plurality of multitime slot digital data buses commonly known as a T-1 line. In PCM switching techniques analog data is sampled at 8 Khz and the resultant sampled data are multiplexed within a periodic time frame. One PCM switching technique utilizes a multi-frame format of 12 frames where each frame includes 24 time slots at a periodic frame rate of 125 μsec.

Each time slot utilizes 8 bits of sampled information to digitally represent the analog information. In a multi-frame format of 12 frames, each frame includes 193 bits per frame and frames 6 and 12 are the signaling frames where the sixth frame is called the A frame and the twelfth frame is called the B frame. During the sixth and twelfth frames of the multi-frame format, the eighth bit (the least significant bit) is utilized for supervisory signaling purposes such as indicating on-hook, off-hook and dial pulsing conditions. Generally, there is no signal degradation if only one of the frames is to be utilized for signaling purposes. It is, therefore, desirable to utilize the signaling bit in the B frame (frame 12) for other purposes, such as a common data channel. This would provide a data channel comprising 24 bits.

Alternatively, another data channel could be utilized by using the framing bit which occurs at the beginning of each frame in a multi-frame format, which identifies the beginning of a particular frame. Odd frames in the multi-frame format (F1, F3, F5, F7, F9, F11) are indicated by framing bit code of alternating "1" and "0". The framing code for odd frames is, therefore, 101010. To identify the signaling frames in a multi-frame format (F6 and F12), the even frames in a multi-frame format utilize a different code to identify the signaling frame. Whenever there is a transition from one frame to a signaling frame in the even frame format, the framing bit changes state. Therefore, the even frame code for frames F2, F4, F6, F8, F10, F12, is 001110. The transition between frame 4 and frame 6 is a change of state to indicate a signaling frame. Similarly, the transition between frame F10 and F12 is a change of state from "1" to "0". The entire framing code is 100011011100. The even frame pattern can be seen as a 000111 code which is required to check the sixth and twelfth frame for desired signaling purposes. It is desirable to utilize the framing code to establish a data channel by periodically removing the 000111 even framing pattern and substituting, therefore, a data channel.

The cross referenced application entitled "Integrated Message Accounting System" utilizes a signal processor to detect dial pulsing, on-hook and off-hook conditions and to send supervisory signaling bits to specified time slots during the signaling frames. In order to enable the connections between a subscriber line and the outside world, there is a need for a communications system between a central office base switch and a local subscriber switch to provide the necessary communications link. This results in the desirable feature of utilizing existing equipment while providing a communications link between a subscriber switch and the central office base switch.

In view of the above background, it is an object of the present invention to provide a communications processor for establishing a communications link between a central office base switch and a local subscriber switch.

SUMMARY OF THE INVENTION

The present invention relates to a communications processor apparatus for use in an integrated telephone transmission and switching system for establishing a communications link between a central office and a digital local subscriber switch.

The system operates in a multiframe format consisting of a plurality of frames including signaling frames where each frame consists of a plurality of time slots having a time slot rate and where the plurality of frames includes signaling frames having supervisory signals where the supervisory signals occur as a signaling bit during each time slot in the signaling frame. The system includes a base switch connected to a plurality of multitime slot buses and subscriber switch means connected to a pair of the buses for connecting a plurality of local subscriber lines to specified time slots on the buses.

The communication processor apparatus includes means connected to receive the signaling bits during the signaling frames and multiplexer means connected to the buffer means for selecting in alternate signaling frames the sequential signaling bits which are in the form of a message on one of the buses from the subscriber switch means. A channel selector connected to the multiplexer means specifies the pair of data buses, thereby enabling the multiplexer means to pass the message signaling bits to the apparatus.

A receiver means is connected to the multiplexer means for receiving the message signaling bits and transmitter means are connected to the multiplexer means for transmitting sequential signaling bits in the form of a message during the alternate signaling frames. A processor is provided for controlling the operation of the apparatus.

In another embodiment, the communications processor could utilize the framing bit code in a manner similar to the reception and transmission of the signaling bits.

In accordance with the above summary, the present invention achieves the objective of providing a communication processor for establishing a communication link between a central office base switch and a subscriber switch.

Additional objects and features of the invention will appear from the following description in which the preferred embodiments of the invention have been set forth in dtail in conjunction with the drawings.

DESCRIPTION OF THE DRAWINGS

FIG. 1 depicts a block diagram of an integrated transmission and switching system in accordance with the present invention.

FIG. 2 depicts a block diagram of a base switch, which forms a portion of FIG. 1.

FIG. 3 depicts a block diagram of a communication processor and signal processor according to the present invention, which forms a portion of FIG. 2.

FIG. 4 depicts a block diagram of a communication processor transmitter, which forms a portion of FIG. 3.

FIG. 5 depicts a block diagram of a communication processor receiver, which forms a portion of FIG. 3.

FIG. 6 depicts a timing diagram for the communication processor of FIG. 3.

DETAILED DESCRIPTION OF THE DRAWINGS

FIG. 1—Block Diagram

Referring to FIG. 1, a block diagram of one embodiment of an integrated digital transmission and switching system (local digital switch) is shown which provides Class 5 central office switching functions. It includes a base switch 10 and one or more subscriber switches such as local subscriber switches 20, 25 and remote subscriber switches 21, 30. The subscriber switches such as switch 20 concentrate and connect a plurality of subscriber lines to the base switch 10. For example, local subscriber switch 20 concentrates and connects up to 336 subscriber lines to the base switch via buses 22, 23.

In one approach for a digital telephone switching system, a multiplicity of conversations are multiplexed serially along a two-wire digitally multiplexed line commonly known as a T-1 line, such as buses 22, 23 in FIG. 1. Each T-1 line has 24 pulse code modulated (PCM) time slots operating in a basic time frame of 125 $\mu$sec. Each time slot is allocated 8 bits in which sampled data between a calling party and a called party is digitally represented in PCM format. Each frame of 125 $\mu$sec includes one frame bit plus 24 time slots of 8 bits each or a total of 193 bits per frame, with the frame rate based upon a sampling rate of 8 KHZ (the reciprocal of 125 $\mu$sec). A typical frame structure known in the art includes a multi-frame format of 12 frames of 193 bits each, in which the eighth bit of each time slot in frames 6 and 12 carries a signaling bit. The signaling bits are used by signal processing circuitry to detect supervisory signals such as on hook, off hook and dial pulse.

In FIG. 1, the base switch 10 is connected to a voice bank 11 via T-1 line 16. Voice bank 11 is well-known equipment which interfaces to 24 trunks, which thereby allows for trunk termination directly on the base switch 10. In one embodiment, the base switch 10 interfaces to the world on 64 T-1 lines (a total of 1536 time slots) and can switch non-blocking between any of its time slots. The base switch 10 is described in the cross-referenced application entitled "An Integrated Message Accounting System".

Each of the 24 or 48 channels between a switch such as subscriber switch 20 and the base switch 10 is referred to as a junctor. The subscriber switches may be collocated with the base switch 10 such as switches 20, 25 or located at a remote site such as remote subscriber switches 21, 30. A remote subscriber switch can interconnect the 336 subscriber lines within the switch. The subscriber carrier terminals (SCT) 26, 31 connect 24 subscriber lines to T-1 lines 27, 32, which provides connections to particular subscriber switches. Equipment remotely located is connected to the various switches through repeaters 13. In one embodiment, a local (LSS) or remote (RSS) subscriber switch can handle up to 336 local loops for connection to the 48 time slots on the T-1 lines. Each subscriber switch, whether local or remote, uses two T-1 lines for connection to the base switch 10. Therefore, in a local subscriber line system with 6384 terminations, the RSS and LSS would require 38 of the available 64 base switch 10 ports available. This leaves 26 ports or 624 channels (26×24) for multi-frequency senders, receivers and trunks.

Various termination examples for the switching system described herein are as follows:

| Trunks | Service Ports | Subscriber Lines |
|---|---|---|
| 1488 (62 T-1) | 48 (2 T-1) | 0 |
| 1416 (49 T-1) | 72 (3 T-1) | 336 (2 T-1) |
| 1272 (53 T-1) | 72 (3 T-1) | 1344 (8 T-1) |
| 1080 (45 T-1) | 72 (3 T-1) | 2688 (16 T-1) |
| 552 (23 T-1) | 72 (3 T-1) | 6384 (38 T-1) |

Before describing FIGS. 1–14 in further detail, a brief overview discussing the routing of a telephone call will be given. When a subscriber goes off hook, this condition is detected by a subscriber switch such as switch 20 and a message is sent to the base switch 10. The message contains the subscriber line number and state of the subscriber originating the call. The base switch 10 finds an idle junctor to the associated subscriber switch and sends a message to the subscriber switch commanding it to connect the subscriber line to the idle junctor. The subscriber switch will make the connection and perform a path test to determine if a path was set up correctly. The base switch 10 will connect dial tone by sending a message to an internal service generator commanding it to attach dial tone to the associated time slot. Dial tone is removed when the first digit is received. The called number is translated in the base switch by an internal system controller to determine how to route the call. For a local call, the base switch system controller checks if the called party is idle and determines the identity of the called party's particular subscriber switch. Ring back tone is applied to the calling party's line and message is sent to the called party's subscriber switch to command it to ring the appropriate line. When the called party answers, the ringing is stopped, the ring back tone is dropped and a path is established between the two junctors through the base switch. An idle junctor to that subscriber switch is selected and it is commanded to set up a connection between that junctor and the called party. No further action occurs until the call terminates and then the path in the base switch is dropped and messages are sent to the associated subscriber switches to command them to drop their connections and restore the lines to the idle condition.

FIG. 2—Base Switch

Referring to FIG. 2, the base switch 10 is shown and is described in more detail in the cross referenced application entitled "Integrated Message Accounting System". The base switch 10 provides switching functions and interfaces directly to 64 T-1 lines. T-1 interfaces are used to connect either local or remote subscriber switches via T-1 lines such as 22, 23 of FIG. 1. Switching functions are provided to connect calls between subscriber switches, either local or remote, and between subscriber switches and trunks. The base switch 10 incorporates redundancy features for each subsystem (primary and secondary) and for simplicity will generally be described herein for only the primary subsystems.

Briefly, the subsystems within base switch 10 include a signal processor 40, line groups 41, time slot interchanger 42, service generator 43, multi-frequency sender/receiver 44, and master clock 45, all of which are controlled by system controller 50. In addition, a communication processor 46 is connected with the signal processor 40 and to the system controller 50 to provide a communications link between subscriber switches and the base switch. The communications link is over associated T-1 lines between the subscriber switch and the base switch, such as lines 22, 23 of FIG. 1, which form a part of buses 53 or 54 of FIG. 2.

With a sampling frequency of 8,000 Hz for encoding PCM data, one timing frame equals 125 microseconds with 24 time slots per frame per T-1 line. Each channel of information is in the form of 8 bit channel words. A framing bit is added every 24 channels to form and define a frame. Each frame of 125 microseconds equals one frame bit plus the 24 time slots of 8 bits each and therefore there are 193 bits per frame.

In a multiframe format of twelve frames, the frame bit occurs once at the start of each frame, with a framing code that takes 12 frames to repeat.

In each time slot there is an 8 bit speech code to digitally represent a quantized value of a particular portion of an analog signal. Once each six frames the eighth bit of each time slot carries a signaling bit to indicate on-hook or off-hook status of that particular channel or time slot.

In PCM systems like that of FIG. 2, quantizing a message signal by certain discrete levels or steps inherently introduces an initial error in the amplitude of the samples, giving rise to quantization noise. Quantization noise can be reduced by the use of nonuniform spacing of levels, to provide smaller steps for weaker signals and coarser quantization near the peak of large signals. The $\mu$-255 companding law utilizes this concept of encoding PCM data in which the coding magnitude range is divided into 8 segments, and 16 levels are equally spaced within each of the 8 segments. From one segment to the next higher, the level spacing (step size) increases by a factor of 2. In the 8 bit code word representing any sample, the first bit gives the sign, the next 3 bits describe which of the 8 segments contain the sample, and the last 4 bits specify the nearest of the 16 possible levels within the segment.

In FIG. 2, data on T-1 lines 53 are applied to both the primary and secondary line groups 41. For example, data is input to primary line group 41-1 and secondary line group 41-2.

As seen in FIG. 2, primary and secondary interface redundancy is employed in all major subsystems to prevent a signal point failure which could cause the system to go down. Faulty subsystems are automatically switched off line to provide minimum interruption to service.

A line group 41 interfaces any T-1 line pairs 53 with time slot interchangers (TSI) 42, designated TSI 1-2. A line group 41 also interfaces multifrequency sender (MFS) and receiver (MFR) 44 with the TSI 42. A group such as line group 41 accepts bipolar PCM data from a T-1 line, which is converted by the line group to 9-bit parallel (includes parity bit) and sent to the time slot interchanger (TSI) 42. Error signals and signal bits are sent to the signal processor (SP) 40 for further analysis.

It is possible to operate 16 T-1 interfaces for each primary and secondary subsystem per line group. Each interface accommodates one T-1 line and up to four line groups per base switch may be used.

A line group organizes the data from 16 T-1 lines or 15 T-1 lines and the MFS onto a 384 time slot data bus 58 to the TSI's 42.

Referring to FIG. 2, the TSI 42 switch channel time slot data (8 bits plus parity) from any of the four line groups to any other channel time slot of any other of the four line groups. For example, data from line group 1 could be sent to TSI and switched out to line group 4. When it is available from a line group data bus, the TSI's hold it until the proper time for output in the next frame and transmit the data to the line group data bus such as bus 59 for output. The TSI 42 contains control and data memory for all time slots and communicate with both the primary and secondary system controllers (SC) 50-1, 50-2.

In FIG. 2, the service generator (SG) 43 provides capability to connect one of several standard tones in PCM format to any of the channel time slots. These tones include 1,000 Hz, 120 IPM busy, 60 IPM busy, dial tone, ring back tone and internal tones for the system. The SG 43 receives control signals from the respective system controller (SC 50).

The signal processor (SP) 40 monitors all the input channels for changes of state and dialed digits. Each time a channel is seized or released, or a digit is dialed, a message is sent to the respective SC 50 containing the channel number and the event. All the information needed to determine the changes of state or dial digits is time division multiplexed over several leads originating from the line group on bus 56.

The SP 40 also has the capability to seize or release channels or dial digits on these channels. Frames 6 and 12 are signaling frames. During these frames, the least significant bit of the 8 bit PCM byte is replaced with a signaling bit. Frame 6 is used for an "A" signaling bit and frame 12 is used for a "B" signaling bit. The signal processor uses the A signaling bit for seizure, release and dial digit detection. The B signaling bit is used for state change detection only.

The signal processor 40 receives and transmits "A" and "B" bits from and to the line groups 41 for on/off hooks and digits. The communication processor 46 performs the control and communication functions for the signal processor.

In one embodiment, the "B" signaling bits, which occur every twelve frames in a multi-frame format, are used to formulate a 24-bit message. All signaling bits are extracted from the T-1 lines by the line groups 41 and routed to the signal processor 40, which will process the signaling bits and route the messages to the system controller 50.

The communication processor 46 also performs the functions of "B" bit receivers and transmitters, interfacing and control, and channel selecting. The communication processor 46 receives and transmits the "B" bits that form the messages to and from the subscriber switches. "B" bits from all of the 64 T-1 ports are received and stored by processor 46. When a message is to be transmitted from the base switch 10 to a subscriber switch, the 24 bits are transferred to the processor 46 which then transmits them to the appropriate line group 41 at the correct time, as will be described.

In one embodiment, a message consists of four bytes of data where the first byte is a control byte and the last three bytes form the message to be sent or received. The CP 46 also scans its internal receivers to check if any messages have been received. If there is a message, it will be sent to the system controller 50. Messages received from the system controller are transferred to the appropriate line group.

In FIG. 2, the Master Clock 45 is a conventional device for generating all basic clock signals used by the base switch.

Should a single point failure occur somewhere in the primary system, the primary system controller 50-1 will de-activate the on-line system by de-activating an "Active" signal. The off-line system will go on-line by the secondary system controller 50-2 activating the secondary master clock 45-2, thereby switching the secondary (redundant) system on-line to process data.

The MF senders (MFS) 44 generate and output MF tone pairs onto a line group data bus 58 for switching through the time slot interchangers 42 to an outgoing path such as bus 59 and communicate directly with system controllers 50. The MF receivers (MFR) detects MF tones in PCM digital input form on bus 58 and send them to the SC 50.

The MFS and MFR jointly share one group of 24 time slots and associated control facilities. A minimum of 8 time slots and a maximum of 16 time slots for each sender and each receiver are available to traffic at any time subject to a total maximum of 24 time slots. Systems with more than one line group may be equipped with the above capacity per line group as required by traffic.

The dual tone multifrequency receivers (DTMF) 47 are connected to the service generator for detecting dual tone multifrequency tones at a local level and operate in a manner similar to the MFR 44.

The primary and secondary system controllers (SC) 50 are typically INTEL 8080A stored program microprocessors surrounded by a number of peripheral I/O devices 51 and interfaced to each subsystem.

The System Controllers 50 provide the following functions:

(1) call processing including routing, ANI (Automatic Number Identification), ONI, recorded announcement control and creation of billing records;

(2) SC self test; and (3) system test and maintenance data outputs for accumulation of traffic monitoring data and generation of traffic monitoring reports. The secondary (redundant) SC 50-2 is updated continuously so that it can assume control of the system with a minimum disruption to service should primary SC 50 experience a failure.

To enable the secondary system controller to come on line and start processing calls should the primary system controller experience a failure, portions of the memory containing the states of all calls in progress are periodically copied into the memory of the secondary system controller through direct memory access techniques which are well known in the art.

Each system controller is equipped with 64K bits of memory addressable by a 16-bit address bus. Further details of the operation of the Intel 8080A microprocessor are described in the Intel 8080A System User's Manual.

FIGS. 3-5 Communications Processor

Referring to FIG. 3, a block diagram of the communication processor 46 is shown. For simplicity, the communication processor 46 is shown connected to one line group, but it is to be understood that processor 46 is also connected to the other line groups in the systems. Data is input on T-1 lines 54 to line group 41 and the A & B signaling bits are gated out on bus 56-1 at the appropriate time into a buffer 201 (S201 RAM) which forms a part of the signal processor 40, the details of which are described in more detail in the cross-referenced application entitled DIAL PULSE REGISTER/SENDER FOR A TDM SWITCHING SYSTEM. The A & B signaling bits are then gated on bus 57 into the dial pulse register sender (DPRS) 202 of the signal processor 40, or into a multiplexer 203 (LS157). Timing signals provided from the signal processor control circuit 204, as seen in FIG. 6, are the DPRS CLK, F1, F2 on buses 264-66. The DP1-DP256 signals on bus 267 provide addressing for up to 386 time slots. The F1 and F2 signals identify frames 1-5, 6, 7-11, and 12, and DPRS CLK provides appropriate clocking during those periods.

The channel selector 205 includes a conventional selector (74150) connected to each line group for identifying which T-1 lines are connected to a subscriber switch. In one embodiment, there are four selectors, one each for the four line groups. The selectors are addressed by the DP1 DP8 signals on bus 267 from the SP control 204. Selector 205 identifies which of the T-1 lines are connected to the subscriber switches, and when ANDed with the F2 signal, will inform the communication processor 46 at which time transmitting and receiving signals to and from a particular subscriber switch can be effected.

The communication processor 46 also includes a CP receiver 207, CP transmitter 208, and central processing unit (CPU) 209, which typically is an Intel 8080A microprocessor and storage circuitry. The program for controlling the operation of the communication processor 46 is set forth in Appendix I.

The communication processor 46 communicates with the base switch system controller 50 of FIG. 2 via buses 210. In order to manipulate the B signaling bit for data communications between the base switch 10 and a subscriber switch the B signaling bits are input from line group 41 into buffer 201 for connecting the signaling bits to either the DPRS 202 or the communication processor 40. If the communication processor 40 is waiting for data from the line group, the selector 203 will connect the B signaling bit into the communication processor. The message is shifted via bus 260 into the CP receiver 207 and connected to the CPU 209 for transmission to the base switch system controller 50. In order to transmit data from the processor 40 to a particular line group, data is loaded from the system controller to the CPU 209, loaded into the CP transmitter 208 and gated out through MUX 203 into buffer 201 and to the line group 41 at the appropriate time.

Referring to FIG. 4, the transmitter 208 of FIG. 3 is shown in more detail. The message to be transmitted to a particular subscriber switch is loaded into shift registers 212, 213, 214, via the data bus 215 from the CPU 209 of FIG. 3. The writing of the messages into shift registers 212–214 is controlled by a typical write decode circuit 216 (LS138), which is loaded with control signals from the CPU.

The CPU also loads address register 217 with a 6 bit address in which the two high-order bits identify the particular line group and four low-order bits identify to which of 16 T-1 lines in a line group the message is to be transmitted. The 2 high-order bits on bus 273 address decoder circuit 218 (LS155), which appropriately connects the message to the particular line group on one of buses 275.

Comparator 219 is continuously comparing addresses DP1-DP8 on bus 267, which provide up to 16 T1 addresses per line group, with the address from address register 217, and when they are equal comparator 219 informs via bus 223 transmit controller 222, a typical logic circuit for enabling the shift registers 212–214 and decoder 218. The data is then output from registers 212–214 and decoder 218 to the appropriate MUX 203 (one LS157 per line group) via bus 275. MUX 203 is enabled by the appropriate signals F2 on bus 266 and the signal on bus 269 from the channel selector 205 of FIG. 3. MUX 203 receives signaling bits on bus 57-3 from DPRS 202 of FIG. 3, and depending upon whether a message is to be sent from the CP, the MUX 203 is appropriately enabled to send a message out to the buffer from the 1Y output on bus 57-2.

The other inputs to the MUX 203 are the 3A input on bus 278, which is a hard-wired "1" to indicate no message; signaling bits from the DPRS 202 into the 1A connection, which are switched out to the buffer through the 1Y connection; data on bus 57-1 from the buffer 201 into the 3B connection and switched out through the 3Y connection on bus 260-1 to the receiver 207.

The transmitter circuit 208 also puts a "busy" bit into busy register 226, which will retain that "busy" state for transmission purposes until reset by the transmit controller 222 (under control of the CPU 209). Thus, the transmitter is only transmitting one message at a time to a particular line group.

Referring to FIG. 5, the CP receiver 207 is shown in more detail. In order to receive messages from a line group, the data occurring during the "B" signaling bit time is gated from the selector 203 of FIG. 3 to latch 230 of FIG. 5. The receiver 207 may receive up to four different messages, one per line group. The data received is input via bus 282 into a message memory 231, a 1 K×4 bit memory for storing messages, and detect memory 232, a 4×16 bit memory for storing the first bit of each of the 64 T-1 lines incoming into the line groups. In order to detect the presence of an incoming message, the first bit of the B signaling bits on the 64 T-1 lines is set to "1" when there is no message, and the first bit on a particular T-1 line is set to a "0" when a message is present, which is then stored in the memory 232, as addressed by address lines DP1-DP8 on bus 267. The presence of the message is input to message flag store circuit 233, in which the set or flag bit is input on bus 295-1 through OR gate 234, AND gate 235 to flag store 236, a 4×16 bit memory for storing the message flag bit for each of the 64 T-1 lines. The gating logic 234, 235, 247 is duplicated for each line group, but is shown for simplicity for one line group.

The flag memory 236 stores the message flag bit and is addressed either by addresses DP1-DP8 or the address from the scan address register 241. The respective addresses are selected by selector 243 through the occurrence of signal F1 on bus 265 which is identifying the framing cycle along with clock F2 during the multiframe format, as previously described. When a message flag bit is detected, the information is sent to the CPU 209 through latches 247, 248 and bus 215. The CPU 209 sequentially scans the 64 T-1 lines by loading the scan address register 241 with four bits for identifying a particular set of 4 T-1 lines (one from each line group). Also, a message flag bit state is gated back to memory 231 on bus 284 to prevent overwriting messages in memory 231.

The CPU reads a message stored in message memory 231 by loading receive address register 240 with the proper address. Four bit address comparator 249, which also receives address DP1-DP8 on bus 267, enables receive controller 250, a typical logic circuit, at the appropriate address time. Two bits from register 240 address MUX 237 for selecting the appropriate line group. Receive controller 250 then enables the three shift registers 256–258 at the proper time for loading the data from message memory 231 onto the 8-bit data bus 215 to the CPU 209.

The flag bit from message detect memory 232 is also input to an overrun circuit 251 (identical to circuit 253) which enables the system to store additional message bits in the event that one message happens to overrun another.

The scan controller 252 enables latch 248 at the appropriate time for sending the message detect flag bits to the CPU. The write controller 253 enables the data to be written into latch 247 and corresponding latches in the overrun circuit 251 during the first 16 channel times of the multiframe format, which is the time in which the message flag bits occur.

The F1 and F2 signals on buses 265, 266 ar ANDed with the DPRS clock signal on bus 267, which when ANDed with the occurrence of the message bit signal from flag store 236 on bus 285 enable the data to be written into message memory 231.

The reset decode circuit 254 (LS155) provides appropriate resetting of the message bits under control of the CPU 209.

The scan controller 252 and receive controller 250 also connect "busy" bits via buses 280, 281 to the busy register 226 of FIG. 4 to indicate that a scan or receive cycle is currently in operation, and is reset upon control completion.

The receive and scanning cycles are briefly described as follows. The B bits are loaded into memory 231 and 232 during frames 7–11 of the multiframe format. During frame 12, the data is shifted from memory 232 to flag store 236 and to the overrun circuit 251. Scanning takes place during frames 1–5, in which the CPU 209 is loading a scan address into scan address register 241. The scanning process is looking for a flag bit in memory 236.

Data is stored during frame 12 at the appropriate addresses generated by DPRS clock 1-16. The scanning addresses are loaded into register 241 and selected by selector 243. The read or receiving cycle is also performed during frames 1-5 by addressing memory 231 by DP1-DP256 on bus 267. The data from message memory 231 is loaded into shift registers 256, 257, 258 and connected to the CPU data bus 215.

The present invention could utilize the framing bit code previously described in order to transmit and receive messages. The communication processor apparatus would then establish communications by utilizing the framing bit code signals rather than the "B" signaling bit format described herein.

APPENDIX I to

MC DONALD ET AL APPLICATION entitled

COMMUNICATION PROCESSOR

Serial No. 875,495

Filed: March 6, 1978

```
 1      /
 2      /////////////////////////////////////////////////////////
 3      //                                                     //
 4      //       C O M M U N I C A T I O N   P R O C E S S O R //
 5      //                                                     //
 6      /////////////////////////////////////////////////////////
 7      /
 8      //       THE COMMUNICATION PROCESSOR (CP) IS A PART OF THE SIGNAL
 9      //       AND COMMUNICATION SUBSYSTEM OF THE ITS 5 SYSTEM.  ITS
10      //       PRIMARY FUNCTION IS TO BE AN INTERFACE TO THE REMOTE
11      //       AND LOCAL SUBSCRIBER SWITCHES (XSS) FROM THE SYSTEM
12      //       CONTROLLER (SC) THE SOFTWARE RESIDES IN 1K OF PROM AND
13      //       IT UTILIZE 1K OF RAM.
14      /
15      /
16      /
17      //       EQUATE TO TOP OF RAM MEMORY
18      /
19      000000 PROM:  EQU    0        ;START OF PROM
20      010000 RAM:   EQU    4096     ; START OF RAM
21      /
22      //       DEFINE THE STACK EQUATES
23      /
24      000042 ST1SZ: EQU    34       ; SIZE OF STACK ONE
25      000024 ST2SZ: EQU    20       ; SIZE OF STACK TWO
26      000024 ST3SZ: EQU    20       ; SIZE OF STACK THREE
27      000036 ST4SZ: EQU    30       ; SIZE OF STACK FOUR
28      000024 STPSZ: EQU    20       ; SIZE OF PRIME SYSTEM STACK
29      /
30      //       SYSTEM EQUATES
31      /
32      000050 SXTMO: EQU    40       ; XSS OUTPUT DRIVER TIME-OUT
33      000050 TSCAN: EQU    40       ; XSS INPUT DRIVER TIME-OUT
34      000050 UXTMO: EQU    40       ; SC OUTPUT DRIVER TIME-OUT
35      000004 TCNT:  EQU    4        ; NUMBER OF TIMERS IN THE SYSTEM
36      /
37      000000 XSTRT: EQU    0        ; OUTPUT SP XMTR START COMMAND
38      000000 RSTAT: EQU    0        ; INPUT SP RECEIVER STATUS
39      000001 SRTSN: EQU    1        ; OUTPUT START SCAN COMMAND
40      000001 SNDAT: EQU    1        ; INPUT SCAN DATA
41      000002 SNADR: EQU    2        ; OUTPUT SCAN ADDRESS
42      000002 RDAT0: EQU    2        ; INPUT RECEIVER BYTE 0
43      000003 RDADR: EQU    3        ; OUTPUT RECEIVER DATA ADDRESS
44      000003 RDAT1: EQU    3        ; INPUT RECEIVER BYTE 1
45      000004 XDAT2: EQU    4        ; OUTPUT TRANSMITTER BYTE 2
46      000004 RDAT2: EQU    4        ; INPUT RECEIVER BYTE 2
47      000005 RSHFT: EQU    5        ; OUTPUT RCVR START SHIFT COMMAND
48      000005 XDAT1: EQU    5        ; XMIT DATA BYTE 1
49      000006 XDAT0: EQU    6        ; XMIT DATA BYTE 0
50      000007 XCADR: EQU    7        ; OUTPUT XMTR CHANNEL ADDRESS
51      000010 UTOUT: EQU    100      ; S.C. TRANSMIT DATA
52      000010 UTINN: EQU    100      ; S.C. RECEIVE DATA
53      000011 UTMRR: EQU    110      ; MASTER RESET
54      000011 UTSTA: EQU    110      ; S.C. STATUS
55      000012 UTAUX: EQU    120      ; OUTPUT TO AUX PORT
```

```
56         000012 UTAXI: EQU      12Q      ; INPUT TO AUX PORT
57         000013 UREST: EQU      13Q      ; RESET INTERRUPT
58                ;
59                ;
60         000001 XMTBY: EQU      1        ; TRANSMITTER BUSY
61         000002 XMTPY: EQU      2        ; TRANSMITTER PARITY
62         000004 SCNBY: EQU      4        ; SCAN BUSY
63         000010 REDBY: EQU      8        ; READ BUSY
64                ;
65                ;;
66                ;
67         000000        NPG
*****
*****
***** MAIN=  68   000000   >UD>STEVE>CP1
*****
68         000000        ORG      PROM
69                ;
70                ;
71                ;
72         000000 PROMS: EQU      $
73                ;
74                ;
75                ;;
76                ;; ;;;;;;;;;;;;;;;;;;;;;;;;;;;;;;;;;;;;;;;;;;;;;;;;;;;;;;;;
77                ;;                                                        ;;
78                ;;        P R O G R A M   R E S T A R T                   ;;
79                ;;                                                        ;;
80                ;; ;;;;;;;;;;;;;;;;;;;;;;;;;;;;;;;;;;;;;;;;;;;;;;;;;;;;;;;;
81                ;;   PROGRAM STARTS HERE OR CAN BE RESTARTED
82                ;;   THIS SECTION DOES THE FOLLOWING:
83                ;;     1. MASTER CLEARS THE SCANNERS
84                ;;     2. ZEROES OUT THE RAM (LOC 10000Q TO 11777Q)
85                ;;     3. SETS UP THE INITIAL STACK POINTER TO LOCATION 11777
86                ;;     4. SETS THE DYNAMIC INPUT/OUTPUT POINTER FOR THE
87                ;;        CIRCULAR BUFFERS TO ITS INITIAL CONDITION
88                ;;     5. ENABLES THE SYSTEM INTERRUPTS (ONLY THE CLOCK)
89                ;;
90                ;
91  000 061 011720        LXI    SP,PSTK  ; SET STACK POINTER TO TOP OF RAM
92  003 076 200           MVI    A,200Q   ; MASTER CLEAR BIT FOR SCANNER
93  005 323 002           OUT    SNADR    ; OUTPUT IT TO THE SCANNER
94  007 041 000000        LXI    H,0
95  012 021 000747        LXI    D,FILLZ  ;(SIZE OF RAM-1)/2=LOOP CNT
96  015 345        ZERO:  PUSH   H        ; FILL RAM WITH ZEROES
97  016 033               DCX    D
98  017 172               MOV    A,D
99  020 263               ORA    E
00  021 302 000015        JNZ    ZERO
01  024 323 012           OUT    UTAUX    ;CLEAR AUX PORT LED'S
02  026 323 011           OUT    UTMRR    ; MASTER RESET
03  030 061 010020        LXI    SP,PNTRE ;SET UP STACK POINTER
04  033 006 004           MVI    B,4      ;LOOP COUNT
05  035 041 000060        LXI    H,XSSTT  ;STARTING ADR OF BUF
06  040 136        LOOP:  MOV    E,M      ;LO ADR OF STARTING ADR
07  041 043               INX    H
08  042 126               MOV    D,M      ;HO ADR OF STARTING ADR
09  043 325               PUSH   D        ;SAVE STARTING ADR AS POINTER
10  044 325               PUSH   D        ;
11  045 043               INX    H
12  046 005               DCR    B        ;DECREMENT LOOP COUNT
13  047 302 000040        JNZ    LOOP
14  052 061 011720        LXI    SP,PSTK  ;RESET UP STACK POINTER
15  055 303 000153        JMP    PROGS    ;START THE PROGRAM
16                ;
17         000000        NPG
18                ;
19                ;;     PADDING TO BRING CLOCK INT ROUTINE TO 700
20                ;
21  060 020 010050 XSSTT: DW     XSBUF    ;XSS INPUT BUFFER
22  062 020 010250 UCSTT: DW     UCBUF    ;XSS OUTPUT BUFFER
23  064 020 010350 URSTT: DW     URBUF    ;SC INPUT BUFFER
24  066 021 010450 UXSTT: DW     UXBUF    ;SC OUTPUT BUFFER
25
26         070000        NPG
27                ;
```

```
28                  ;;   SYSTEM  INTERRUPT  HANDLER
29                  ;
30                  ;;   THE INTERRUPT HANDLER IS RESPONSIBLE FOR TWO TASKS.
31                  ;;          1. WHEN DATA FROM THE SYSTEM CONTROLLER IS
32                  ;;             AVAILABLE FOR INPUT, PROGRAM WILL INTERRUPT
33                  ;;             TO THIS ADDRESS. THE 8-BIT CHARACTER IS THEN
34                  ;;             STORED IN A TEMPORARY 64 CHARACTER CIRCULAR
35                  ;;             BUFFER(16 ENTRIES) WHICH IS ASSUMED TO NEVER
36                  ;;             GET FULL
37                  ;;          2. THE 24 MILLISECOND CLOCK WILL INTERRUPT
38                  ;;             TO THIS LOCATION ALSO.
39                  ;;   THIS HANDLER CHECKS THE UART INPUT STATUS TO
40                  ;;   DETERMINE WHICH OF THE TWO INTERRUPTS HAD OCCURRED.
41                  ;;
42                  ;;        ** WARNING WARNING **
43                  ;;
44                  ;;   THE MAIN LINE PROGRAM MUST CLEAR THE TEMPORARY BUFFER
45                  ;;   OR OVER-RUN CAN OCCUR. CURRENT ESTIMATE IS THAT
46                  ;;   THE S.C. INTERFACE WILL TRANSMIT DATA AT A RATE OF
47                  ;;   300 MICROSECONDS PER CHARACTER SO THE MAIN-LINE
48                  ;;   PROGRAM HAS APPROXIMATELY 4.8 MILLISECONDS TO
49                  ;;   EXECUTE THE BACKGROUND PROGRAM TO CLEAR THE BUFFER.
50                  ;;   IN ADDITION THE CLOCK ROUTINE INTERRUPTS ONCE
51                  ;;   EVERY 24 MILLISECONDS THEREFORE THE CLOCK FLAG
52                  ;;   IS ASSUMED TO BE CLEARED AT EACH CLOCK INTERRUPT.
53                  ;;
54         000070 STINT:
55 070 365          PUSH    PSW      ; SAVE CC AND REGISTER TO BE USED
56 071 333 011      IN      UTSTA    ; INPUT SC INTERFACE STATUS
57 073 017          RRC              ; CHECK IF UART INPUT WAITING
58 074 322 000143   JNC     STCLK    ; NOT WAITING MUST BE THE CLOCK
59 077 325          PUSH    D
60 100 345          PUSH    H
61 101 052 010004   LHLD    URFST    ; INPUT POINTER OF INT. BUFFER
62 104 333 010      IN      UTINN    ; INPUT DATA
63 106 167          MOV     M,A      ; SAVE DATA IN INT. BUFFER
64 107 043          INX     H        ; INCREMENT POINTER OF INT. BUFFER
65               ; UPDATE MESG POINTER OF THE CIRCULAR BUFFER
66 110 353          XCHG             ;DE=POINTER OF CURRENT MESG IN BUF
67 111 041 010450   LXI     H,UREND  ;ENDING ADR OF BUFFER
68 114 315 001656   CALL    COMPR    ;** COMPARE END OF BUFFER SR **
69 117 332 000125   JC      STPTR    ;NOT END OF BUFFER
70               ; END OF BUFFER
71 122 052 000064   LHLD    URSTT    ;HL=STARTING ADR OF BUFFER
72 125 042 010004 STPTR: SHLD URFST  ;SAVE UPDATED POINTER FOR CIRCULAR BUF
73 130 041 011603   LXI     H,URCNT  ;UPDATE # BYTES RCV'D
74 133 064          INR     M
75 134 341          POP     H        ; RETRIEVE REGISTERS
76 135 321          POP     D
77 136 323 013      OUT     UREST    ;RESET INTERRUPT
78 140 303 000150   JMP     STRET    ;RESTORE REG'S AND RETURN
79         000143 STCLK: EQU $       ; TICK THE CLOCK
80 143 257          XRA     A        ; SET "A" TO 1
81 144 074          INR     A
82 145 062 010022   STA     TICK     ; SAVE CLOCK TICK
83 150 361   STRET: POP     PSW
84 151 373          EI
85 152 311          RET
86         000200          NPG
87 153 373   PROGS: EI
88                  ;
89                  ;
90         000154 START:
91                  ;
92                  ;;;;;;;;;;;;;;;;;;;;;;;;;;;;;;;;;;;;;;;;;;;;;;;;;;;;;
93                  ;;                                                 ;;
94                  ;;      BACKGROUND  CLK. ROUTINE                   ;;
95                  ;;                                                 ;;
96                  ;;;;;;;;;;;;;;;;;;;;;;;;;;;;;;;;;;;;;;;;;;;;;;;;;;;;;
97                  ;;
98                  ;;   THIS SECTION CHECKS THE TIMERS WHICH WERE COUNTED DOWN
99                  ;;   BY THE FOREGROUND CLOCK ROUTINE. IF THE TIMER IS ZERO,
00                  ;;   STACK IS RESET TO ITS INITIAL STATE. THIS ALLOWS
01                  ;;   THE I/O TO BE RESTARTED. TIMERS WHICH HAVE A VALUE OF
02                  ;;   LESS THAN ZERO ARE ASSUMED TO BE DISABLED.
03                  ;
04                  ;
```

```
05                   ;*************** 188 MICROSECONDS ******************
06                   ;
07                   ; CHECK REAL TIME CLOCK AND UPDATE VARIOUS TIMERS
08                   ;
09  154 072 010022           LDA     TICK
10  157 247                  ANA     A
11  160 312 000206           JZ      SCLOK   ;RTC NOT TICKED
12                   ;
13                   ; RTC TICKED, UPDATE TIMERS
14  163 006 004              MVI     B,TCNT  ;# TIMERS
15  165 041 010034           LXI     H,TIMER ;TIMER TABLE
16  170 176         CLOOP:   MOV     A,M     ;GET A TIMER
17  171 247                  ANA     A
18  172 372 000201           JM      CCONT   ;DISABLED
19  175 312 000201           JZ      CCONT   ;ALREADY TIME-OUT
20                   ; NOT TIME-OUT, DECREMENT THE TIMER
21  200 065                  DCR     M
22  201 043         CCONT:   INX     H       ;NEXT TIMER
23  202 005                  DCR     B       ;# TIMER
24  203 302 000170           JNZ     CLOOP   ;NOT DONE YET
25                   ;
26                   ;
27  206 041 010034 SCLOK: LXI B,TIMER ; GET POINTER TO THE TIMERS
28  211 012                  LDAX    B       ; GET XSS INPUT TIMER
29  212 247                  ANA     A
30  213 302 000244           JNZ     SC2     ; DID NOT TIME-OUT, GO TO NEXT
31  216 075                  DCR     A       ; TIMED-OUT
32  217 002                  STAX    B       ; DISABLE THE TIMER
33  220 041 011673           LXI     H,STK1  ;RE-INIT XSS I/P DRIVER STATE
34  223 076 043              MVI     A,ST1SZ+1   ;# BYTES IN THE STACK
35  225 315 001667           CALL    CLEAR   ;** CLEAR THE STACK SR **
36                   ; RETURNED HL=STARTING STACK POINTER-1
37  230 042 010040           SHLD    TSTK1   ; POINTER TO INITIAL STATE
38  233 052 000060           LHLD    XSSTT   ;STARTING ADR OF BUF
39  236 042 010014           SHLD    XSFST   ;NEXT-IN
40  241 042 010016           SHLD    XSLST   ;NEXT-OUT
41                   ;
42  244 003         SC2:     INX     B       ; POINT TO NEXT TIMER
43  245 012                  LDAX    B       ; GET XSS OUTPUT TIMER
44  246 247                  ANA     A
45  247 302 000300           JNZ     SC3     ; DID NOT TIME-OUT, GO TO NEXT
46  252 075                  DCR     A       ; TIMED-OUT
47  253 002                  STAX    B       ; DISABLE THE TIMER
48  254 041 011630           LXI     H,STK2  ;RE-INIT XSS O/P DRIVER STATE
49  257 076 025              MVI     A,ST2SZ+1   ;# BYTES IN THE STACK
50  261 315 001667           CALL    CLEAR   ;** CLEAR THE STACK SR **
51                   ; RETURNED HL=STARTING STACK POINTER-1
52  264 042 010042           SHLD    TSTK2
53  267 052 000062           LHLD    UCSTT   ;STARTING ADR OF BUF
54  272 042 010010           SHLD    UCFST   ;NEXT-IN
55  275 042 010012           SHLD    UCLST   ;NEXT-OUT
56                   ;
57  300 003         SC3:     INX     B       ; POINT TO NEXT TIMER
58  301 012                  LDAX    B       ; GET SC INPUT DRIVER TIMER
59  302 247                  ANA     A
60  303 302 000336           JNZ     SC4     ; DID NOT TIME-OUT, GO TO NEXT
61  306 075                  DCR     A
62  307 002                  STAX    B       ; DISABLE THE TIMER
63  310 041 011603           LXI     H,STK3  ;RE-INIT SC I/P DRIVER STATE
64  313 076 025              MVI     A,ST3SZ+1   ;# BYTES IN THE STACK
65  315 363                  DI
66  316 315 001667           CALL    CLEAR   ;** CLEAR THE STACK SR **
67                   ; RETURNED HL=STARTING STACK POINTER-1
68  321 042 010044           SHLD    TSTK3
69  324 052 000064           LHLD    URSTT   ;STARTING ADR OF BUF
70  327 042 010004           SHLD    URFST   ;NEXT-IN
71  332 042 010006           SHLD    URLST   ;NEXT-OUT
72  335 373                  EI
73                   ;
74  336 003         SC4:     INX     B       ; POINT TO NEXT TIMER
75  337 012                  LDAX    B       ; GET SC OUTPUT DRIVER TIMER
76  340 247                  ANA     A
77  341 302 000372           JNZ     SDONE   ; DID NOT TIME-OUT, GO EXIT
78  344 075                  DCR     A       ; TIMED-OUT
79  345 002                  STAX    B       ; DISABLE THE TIMER
80  346 041 011556           LXI     H,STK4  ;RE-INIT SC O/P DRIVER STATE
```

```
81 351 076 037              MVI    A,ST4SZ+1        ;# BYTES IN THE STACK
82 353 315 001667           CALL   CLEAR            ;** CLEAR THE STACK SR **
83                        ; RETURNED HL=STARTING STACK POINTER-1
84 356 042 010046           SHLD   TSTK4
85 361 052 000066           LHLD   UXSTT
86 364 042 010020           SHLD   UXFST            ;STARTING ADR OF BUF
87 367 042 010042           SHLD   UXLST            ;NEXT-OUT
88         000000           NPG
89                       ;
90                       ;;;;;;;;;;;;;;;;;;;;;;;;;;;;;;;;;;;;;;;;;;;;;;;;;;;;;;;
91                       ;;                                                   ;;
92                       ;;        M A I N    P R O C E S S                   ;;
93                       ;;                                                   ;;
94                       ;;;;;;;;;;;;;;;;;;;;;;;;;;;;;;;;;;;;;;;;;;;;;;;;;;;;;;;
95                       ;
96                       ;;  THE FOLLOWING SECTION CALLS EACH I/O DRIVER WITH ITS
97                       ;;  OWN STACK. AFTER THE DRIVER RETURNS CONTROL, THE
98                       ;;  CURRENT STACK ADDRESS IS SAVED FOR THE ENTRY
99                       ;;  OF THE NEXT PASS.
00                       ;
01                       ;*************** 228 MICROSECONDS *****************
02          000372 SDONE: EQU    $
03 372 052 010046           LHLD   TSTK1            ; GET THE STACK FOR THE XSS INPUT DRIVER
04 375 371                  SPHL
05 376 341                  POP    H                ; GET WHATS ON TOP OF STACK
06 377 345                  PUSH   H                ; RETURN IT TO THE TOP
07 400 175                  MOV    A,L              ; IF TOP OF STACK = 0, THEN I/O NOT
08                       ;                          ; ACTIVE
09 401 264                  ORA    H                ; CHECK FOR ZERO
10 402 300                  RNZ                     ; GO TO WHERE WE LEFT OFF
11 403 315 000514           CALL   SRCVR            ; CALL THE START OF THE DRIVER
12 406 041 000000 SRWAT: LXI    H,0              ; OBTAIN CURRENT STACK POINTER
13 411 071                  DAD    SP
14 412 042 010040           SHLD   TSTK1            ; SAVE FOR NEXT CALL
15                       ;
16 415 052 010042           LHLD   TSTK2            ; GET THE STACK FOR THE XSS OUTPUT
17                       ;                          ; DRIVER
18 420 371                  SPHL
19 421 341                  POP    H                ; GET WHATS ON TOP OF STACK
20 422 345                  PUSH   H                ; RETURN IT TO THE TOP
21 423 175                  MOV    A,L              ; IF TOP OF STACK = 0, THEN I/O NOT
22                       ;                          ; ACTIVE
23 424 264                  ORA    H                ; CHECK FOR ZERO
24 425 300                  RNZ                     ; GO TO WHERE WE LEFT OFF
25 426 315 001117           CALL   SXMTR            ; CALL THE START OF THE DRIVER
26 431 041 000000 SXWAT: LXI    H,0              ; OBTAIN CURRENT STACK POINTER
27 434 071                  DAD    SP
28 435 042 010042           SHLD   TSTK2            ; SAVE FOR NEXT CALL
29                       ;
30 440 052 010044           LHLD   TSTK3            ; GET THE STACK FOR THE SC INPUT DRIVER
31 443 371                  SPHL
32 444 341                  POP    H                ; GET WHATS ON TOP OF STACK
33 445 345                  PUSH   H                ; RETURN IT TO THE TOP
34 446 175                  MOV    A,L              ; IF TOP OF STACK = 0, THEN I/O NOT
35                       ;                          ; ACTIVE
36 447 264                  ORA    H                ; CHECK FOR ZERO
37 450 300                  RNZ                     ; GO TO WHERE WE LEFT OFF
38 451 315 001234           CALL   URCVR            ; START OF DRIVER
39 454 041 000000 URWAT: LXI    H,0              ; OBTAIN CURRENT STACK POINTER
40 457 071                  DAD    SP
41 460 042 010044           SHLD   TSTK3            ; SAVE FOR NEXT CALL
42                       ;
43 463 052 010046           LHLD   TSTK4            ; GET THE STACK FOR THE SC OUTPUT DRIVER
44 466 371                  SPHL
45 467 341                  POP    H                ; GET WHATS ON TOP OF STACK
46 470 345                  PUSH   H                ; RETURN IT TO TOP
47 471 175                  MOV    A,L              ; IF TOP OF STACK = 0, THEN I/O NOT
48                       ;                          ; ACTIVE
49 472 264                  ORA    H                ; CHECK FOR ZERO
50 473 300                  RNZ                     ; GO TO WHERE WE LEFT OFF
51 474 315 001455           CALL   UXMIT            ; START OF PROCESSOR
52 477 041 000000 UXWAT: LXI    H,0              ; OBTAIN CURRENT STACK POINTER
53 502 071                  DAD    SP
54 503 042 010046           SHLD   TSTK4            ; SAVE FOR NEXT CALL
55                       ;
56 506 061 011720           LXI    SP,PSTK          ; GET ORIGINAL PRIME STACK
57 511 303 000154           JMP    START            ; GO TO BEGINNING
```

```
58          000200          NPG
59                      ;
60                      ;****************************************************
61                      ;*                                                  *
62                      ;*     X S S    I N P U T    D R I V E R            *
63                      ;*                                                  *
64                      ;****************************************************
65                      ;
66                      ;
67                      ;;    THIS SECTION IS USED TO SCAN THE CP MEMORY FOR
68                      ;;    INCOMING MESSAGES FROM THE XSS WHICH NEED TO
69                      ;;    BE TRANSMITTED TO THE SYSTEM CONTROLLER.  EACH
70                      ;;    CHANNEL 0-15 IS SCANNED SEQUENTIALLY UNTIL STATUS
71                      ;;    BITS ARE FOUND TO BE SET.  FOR EACH CHANNEL SCANNED
72                      ;;    FOUR STATUS BITS CORRESPONDING TO EACH LINE GROUP
73                      ;;    ARE CHECKED.  ONCE A STATUS BIT IS FOUND SET, THE
74                      ;;    4-BIT CHANNEL ADDRESS AND THE 2-BIT LINE GROUP
75                      ;;    NUMBER IS COMPOSED INTO A 6-BIT ADDRESS WHICH IS
76                      ;;    RETRANSMITTED TO THE SCANNER AND THEN THE SHIFT
77                      ;;    REGISTER IS ACTIVATED.  THIS CAUSES THE 3 BYTE MESSAGE
78                      ;;    FROM THE XSS TO BE LOADED INTO 3 CORRESPONDING SHIFT
79                      ;;    REGISTERS FOR SUBSEQUENT INPUT TO THE CP PROGRAM
80                      ;;    AFTER THIS PROCESS IS COMPLETE THE STATUS BIT IS RESET.
81                      ;;    ALL 3 BYTE MESSAGES ARE STORED INTO THE XSS TO S.C.
82                      ;;    CIRCULAR BUFFER WITH A ONE BYTE HEADER.
83                      ;;
84  514 257             SRCVR:  XRA     A
85       000515         SRMAN:
86  515 062 010021              STA     SRADR    ;SAVE CHANNEL #
87  520 323 002                 OUT     SNADR    ;CHANNEL #(0-15)
88  522 323 001                 OUT     SRTSN    ;START SCAN PROCESS
89  524 315 001070              CALL    SRSTA    ;WAIT FOR READY
90  527 333 001         SREDY:  IN      SNDAT    ;SCAN RESULT
91                      ; MESG FLAG FOR LG 0-3 IN BITS 0-3 OF A REG
92                      ;
93  531 006 004                 MVI     B,4      ;4 LINE GROUPS,B=LOOP COUNT
94  533 037             SRLOP:  RAR              ;CHECK WHICH LG HAS DATA
95  534 365                     PUSH    PSW
96  535 305                     PUSH    B
97  536 322 000706              JNC     SRNDN    ;NONE RCV'D IN THIS LG
98                      ;
99                      ; MESG RCV'D IN THIS CHANNEL AND LG, FORM THE CHANNEL
00                      ; ADDRESS, START MEMORY AND START RECV DATA
01                      ;
02  541 170                     MOV     A,B      ;LINE GROUP #
03  542 326 004                 SUI     4
04  544 057                     CMA              ;NORMALIZE
05  545 074                     INR     A        ;LINE GROUP #
06  546 007                     RLC
07  547 007                     RLC
08  550 007                     RLC
09  551 007                     RLC              ;MOVE LG TO BITS 5-4
10  552 041 010021              LXI     H,SRADR  ;CHANNEL # IN BITS 3-0
11  555 206                     ADD     M        ;LG #+CH #
12  556 062 010020              STA     SRADD    ;TEMP SAVE
13  561 323 003                 OUT     RDADR    ;START MEMORY
14  563 333 005                 IN      RSHFT    ;START RECV DATA SHIFT
15                      ;
16                      ; CHECK BUSY BIT, READ DATA AND STORE DATA INTO BUFFER
17                      ;
18  565 333 000         SRLOO:  IN      RSTAT    ;RCVR STATUS
19  567 346 010                 ANI     BIT3     ;ISOLATE RCVR READ BUSY
20  571 312 000602              JZ      SRLOD    ;NOT BUSY, READY TO READ
21                      ; WAIT IN THE SYSTEM AND CHECK AGAIN
22  574 315 000406              CALL    SRWAT
23  577 303 000565              JMP     SRLOO    ;LOOP UNTIL BUSY BIT GONE
24                      ;
25                      ; READ AND VERIFY RCV'D MESG, IF IT IS VALID,STORE INTO
26                      ; BUFFER AND XFER IT INTO SC OUTPUT BUFFER, OTHERWISE,
27                      ; DUMP IT.
28                      ;
29  602 052 010014      SRLOD:  LHLD    XSFST    ;NEXT-IN POINTER OF BUFFER
30  605 072 010020              LDA     SRADD    ;LG #+CHANNEL #
31  610 167                     MOV     M,A      ;STORE AS HEADER
32  611 043                     INX     H        ;BUMP PAST HEADER
33  612 333 002                 IN      RDAT0    ;DATA BYTE 0
```

```
34 614 062 010023              STA     XSSW1    ;TEMP SAVE
35 617 167                     MOV     M,A      ;STORE INTO XSS I/P BUFFER
36 620 043                     INX     H
37 621 333 003                 IN      RDAT1    ;DATA BYTE 1
38 623 167                     MOV     M,A
39 624 043                     INX     H
40 625 333 004                 IN      RDAT2    ;DATA BYTE 2
41 627 167                     MOV     M,A
42 630 043                     INX     H
43 631 345                     PUSH    H        ;SAVE NEXT-IN POINTER
44                     ;
45                     ; FINISHED READ PROCESS
46                     ; CLEAR SCAN FLAGS ON THE CHANNEL
47                     ;
48 632 072 010020              LDA     SRADD    ;LG #+CH #
49 635 366 100                 ORI     BIT6     ;ENABLE FLAG RESET
50 637 323 002                 OUT     SNADR    ;RESET RCVR SCAN
51 641 323 001                 OUT     SRTSN    ;START THE SCAN RESET PROCESS
52 643 315 001070              CALL    SRSTA    ;WAIT FOR SCAN RESET COMPLETION
53                     ;
54                     ; VERIFY RCV'D MESG, IF OP CODE IS ALL 1'S OR BIT 0
55                     ; OF RCV'D BYTE 1 IS 1, DUMP IT
56                     ;
57 646 072 010023              LDA     XSSW1    ;RESTORE RCV'D DATA BYTE 0
58 651 017                     RRC              ;CHECK BIT 0
59 652 332 000753              JC      SRERR    ;ERROR, DUMP
60 655 376 177                 CPI     177Q     ;CHECK ALL 1'S CONDITION
61 657 312 000753              JZ      SRERR    ;ERROR, DUMP
62                     ;
63                     ; VALID MESG RCV'D, CHECK BUFFER OVERFLOW, STORE MESG INTO BUFFER
64                     ; (BY UPDATING NEXT-IN POINTER) AND INCREMENT MESG COUNT
65                     ;
66 662 321                     POP     D        ;RESTORE CURRENT NEXT-IN POINTER
67 663 041 010250              LXI     H,XSEND  ;ENDING ADDR OF XSS I/P BUF
68 666 315 001656              CALL    COMPR    ;** COMPARE END OF BUF SR **
69 671 332 000677              JC      SRCOT    ;NOT OVERFLOW, STORE CURRENT
70                     ; OVERFLOW, REINITIALIZE NEXT-IN POINTER
71 674 052 000060              LHLD    XSSTT
72 677 042 010014 SRCOT:       SHLD    XSFST    ;UPDATE NEXT-IN POINTER
73 702 041 011673              LXI     H,XSCNT
74 705 064                     INR     M        ;INCREMENT XSS I/P MESG COUNT
75                     ;
76                     ;
77                     ; CHECK NEXT CHANNEL
78                     ;
79         000706 SRNON:
80 706 301                     POP     B        ;RESTORE LG #(0-3)
81 707 361                     POP     PSW      ;RESTORE RCV'D SCAN DATA
82 710 005  SRCON:              DCR     B        ;CHECK NEXT LG #
83 711 302 000533              JNZ     SRLOP    ;NOT DONE
84                     ;
85                     ; FINISHED TO PROCESS RCV'D DATA
86                     ; MOVE XSS I/P MESG TO SC O/P BUFFER, IF THERE IS ANY
87                     ; (MAKE SURE ROOMS AVAILABLE)
88                     ;
89 714 072 011673              LDA     XSCNT    ;# XSS I/P MESG
90 717 247                     ANA     A
91 720 312 000735              JZ      SRCHK    ;NONE RCV'D
92 723 041 011556              LXI     H,UXCNT  ;SC O/P MESG COUNT
93 726 076 212                 MVI     A,UXMSG  ;# MESG ALLOWED IN THE BUF
94 730 226                     SUB     M        ;CHECK ROOM AVAILABLE
95 731 107                     MOV     B,A      ;TEMP SAVE
96 732 322 000757              JNC     SMOVE    ;SPACE AVAILABLE, MOVE DATA
97                     ; NO ROOM, WAIT IN THE SYSTEM TILL BUFFER FREE
98                     ; CHECK NEXT CHANNEL
99                     ;
00 735 072 010021 SRCHK:       LDA     SRADR    ;CHANNEL #(0-15)
01 740 074                     INR     A
02 741 376 020                 CPI     16       ;16X4 MEMORY TO SCAN
03 743 302 000515              JNZ     SRMAN    ;NOT DONE
04                     ; DONE, UPDATE CHANNEL # AND RETURN
05 746 257                     XRA     A
06 747 062 010021              STA     SRADR
07 752 311                     RET
```

```
08                  ;
09                  ;
10                  ;
11                  ; ERROR(BIT 0=0 OR OP CODE=ALL 1'S), DUMP
12                  ;
13  753 341    SRERR: POP   H          ;GET RID OF 1 STACK
14  754 303 000706     JMP   SRNON      ;CHECK NEXT CHANNEL
15                  ;
16                  ;
17                  ;
18                  ;
19                  ; FIGURE # MESG CAN BE XFERED
20                  ;
21  757 072 011673 SMOVE: LDA   XSCNT   ;# MESG RCV'D IN XSS I/P BUF
22  762 117           MOV   C,A        ;TEMP SAVE # MESG XFERED
23  763 220           SUB   B
24  764 332 000770    JC    SRSET
25  767 117           MOV   C,A        ;# MESG XFERED
26          000770 SRSET:
27                  ;
28                  ; MOVE THE MESG(4 BYTES) FROM XSS TO SC
29                  ;
30  770 052 010016 SRSAV: LHLD  XSLST   ;POINTER OF LAST PROCESSED MESG
31  773 353           XCHG
32  774 052 010000    LHLD  UXFST      ;POINTER OF CURRENT MESG(SC)
33  777 006 004       MVI   B,URBYT    ;# BYTES/MESG
34          001001 SMLOP: EQU   $
35  001 032           LDAX  D          ;A=DATA BYTE
36  002 167           MOV   M,A        ;SAVE INTO THE SC O/P BUFFER
37  003 023           INX   D          ;INCREMENT XSS I/P BUF POINTER
38  004 043           INX   H          ;INCREMENT SC O/P BUF POINTER
39  005 005           DCR   B          ;DECREMENT # BYTES/MESG
40  006 302 001001    JNZ   SMLOP      ;NOT DONE
41  011 345           PUSH  H          ;TEMP SAVE UXFST(NEXT=IN)
42                  ;
43                  ; CHECK FOR END OF CIRCULAR BUFFER(XSS'S AND SC'S)
44                  ; DE=XSLST
45  012 041 010250    LXI   H,XSEND    ;ENDING ADR OF XSS I/P BUF
46  015 315 001656    CALL  COMPR      ;** COMPARE END OF BUF SR **
47  020 332 001026    JC    SMOD1      ;NOT THE END OF BUFFER
48  023 052 000060    LHLD  XSSTT      ;END OF BUF, RESET
49  026 042 010016 SMOD1: SHLD  XSLST   ;UPDATE POINTER OF XSS I/P BUF
50                  ;
51                  ; UPDATE POINTER FOR SC'S CIRCULAR BUFFER
52  031 321           POP   D          ;DE=UXFST(NEXT=IN POINTER)
53  032 041 011520    LXI   H,UXEND    ;ENDING ADR OF SC O/P BUF
54  035 315 001656    CALL  COMPR      ;** COMPARE END OF BUF SR **
55  040 332 001046    JC    SMOD2      ;NOT END OF THE BUF
56  043 052 000066    LHLD  UXSTT      ;END OF BUF, RESET
57  046 042 010000 SMOD2: SHLD  UXFST   ;UPDATE POINTER OF SC O/P BUF
58  051 041 011673    LXI   H,XSCNT    ;DECREMENT XSS I/P MESG COUNT
59  054 065           DCR   M
60  055 041 011556    LXI   H,UXCNT    ;SC O/P MESG COUNT
61  060 064           INR   M          ;INCREMENT SC O/P MESG COUNT
62  061 015           DCR   C          ;DECREMENT # MESG TO XFERED
63  062 302 000770    JNZ   SRSAV      ;NOT DONE, KEEP MOVING DATA
64  065 303 000735    JMP   SRCHK      ;CHECK NEXT CHANNEL
65                  ;
66                  ;; XSS RECEIVER SCAN STATUS
67                  ;
68          001070 SRSTA: EQU   $
69  070 076 050       MVI   A,TSCAN    ; GET SCAN TIME-OUT MARK
70  072 062 010034    STA   SRTMR
71  075 333 000 STLP1: IN    RSTAT      ; INPUT STATUS
72  077 346 004       ANI   SCNBY      ; CHECK BUSY FLAG
73  101 312 001112    JZ    SOK
74  104 315 000406    CALL  SRWAT      ; GO TO EXEC
75  107 303 001070    JMP   STLP1
76          001112 SOK: EQU   $
77  112 075           DCR   A
78  113 062 010034    STA   SRTMR      ; DISABLE TIMER
79  116 311           RET
80          000000    NPG
81                  ;
```

```
82      ;*************************************************************
83      ;*
84      ;*      X S S    O U T P U T    D R I V E R                  *
85      ;*
86      ;*************************************************************
87      ;
88      ;;      THIS SECTION PERFORMS THE TRANSMISSION OF MESSAGES TO
89      ;;      THE REMOTE/LOCAL SUBSCRIBER SWITCHES. IF A MESSAGE IS
90      ;;      IN THE CIRCULAR BUFFER, THIS ROUTINE WILL BE ACTIVATED
91      ;;      AND PROCEED TO TRANSMIT DATA. THE FOLLOWING IS THE
92      ;;      SEQUENCE OF EVENTS:
93      ;;
94      ;;              1. CHECK TRANSMITTER STATUS AND WAIT FOR READY
95      ;;              2. GET FIRST BYTE FROM THE CIRCULAR BUFFER AND
96      ;;                 EXTRACT THE CHANNEL ADDRESS. OUTPUT THIS
97      ;;                 BYTE TO PORT 7.
98      ;;              3. GET THE NEXT 3 BYTES FROM THE CIRCULAR BUFFER
99      ;;                 AND OUTPUT IT TO PORTS 6, 5, AND 4 IN THAT
00      ;;                 ORDER.
01      ;;              4. START THE TRANSMITTER AND WAIT FOR TIME-OUT
02      ;;                 OR COMPLETION.
03      ;;              5. UPON COMPLETION UPDATE CIRCULAR BUFFER
04      ;;                 POINTERS AND RETURN.
05      ;;
06      ;;      NOTE: IF TIME-OUT HAD OCCURRED THE BACKGROUND CLOCK
07      ;;            PROCESSOR WOULD HAVE RESTARTED THIS SEQUENCE.
08      ;
09          001117 SXMTR: EQU    $
10 117 072 011630        LDA    UCCNT    ;CHECK ANY MESG TO SEND TO XSS
11 122 247               ANA    A
12 123 310               RZ              ;NONE TO SEND
13      ; MESG TO SEND TO XSS
14      ; CHECK XMTR STATUS FIRST
15 124 315 001203        CALL   SXSTA    ;** XMTR STATUS SR **
16 127 052 010012        LHLD   UCLST    ;(HL)=OUTPUT POINTER
17      ;
18      ; XMIT MESSAGE TO XSS
19      ;
20 132 176               MOV    A,M      ;GET HEADER
21 133 346 077           ANI    77Q      ;EXTRACT LG# AND CH#
22 135 323 007           OUT    XCADR    ;CHANNEL ADDRESS
23 137 043               INX    H
24 140 176               MOV    A,M      ;GET DATA BYTE 0
25 141 323 006           OUT    XDAT0
26 143 043               INX    H
27 144 176               MOV    A,M      ;GET DATA BYTE 1
28 145 323 005           OUT    XDAT1
29 147 043               INX    H
30 150 176               MOV    A,M      ;GET DATA BYTE 2
31 151 323 004           OUT    XDAT2
32 153 043               INX    H
33 154 323 000           OUT    XSTRT    ;START TRANSMITTER
34      ;
35      ; UPDATE OUTPUT BUFFER POINTER
36      ;
37 156 353               XCHG            ;SWAP, MOVE CURRENT ADDR TO (DE) REG
38 157 041 010350        LXI    H,UCEND  ;HL=ENDING ADDR OF BUFFER
39 162 315 001656        CALL   COMPR    ;** COMPARE END TO CURRENT BUF **
40 165 332 001173        JC     SXLIM    ;STILL IN THE MIDDLE OF CIR BUF
41 170 052 000062        LHLD   UCSTT    ;END OF BUF, RESET
42 173 042 010012 SXLIM: SHLD   UCLST    ; SAVE NEW OUPUT POINTER
43 176 041 011630        LXI    H,UCCNT  ; GET BUFFER RECORD COUNTER
44 221 065               DCR    M        ;DECREMENT BUFFER RECORD COUNTER
45 202 311               RET
46      ;
47      ;----------------------------------------------------------
48      ;;      XSS TRANSMITTER STATUS
49      ;
50          001203 SXSTA: EQU   $
51 203 345               PUSH   H
52 204 076 050           MVI    A,SXTMO
53 206 062 010235        STA    SXTMR    ; SET A CLOCK
54 211 333 000 SXTLP:    IN     RSTAT    ; TRANSMITTER STATUS
55 213 017               RRC
56 214 322 001225        JNC    SXOK
```

```
57  217 315 000431           CALL    SXWAT    / WAIT IN THE SYSTEM
58  222 303 001211           JMP     SXTLP    / CHECK STATUS AGAIN
59  225 257         SXOK:    XRA     A
60  226 075                  DCR     A
61  227 062 010035           STA     SXTMR    / DISABLE THE TIMER
62  232 341                  POP     H
63  233 311                  RET
64          000000           NPG
65                   /
66                   /****************************************************
67                   /*                                                   *
68                   /*        S C    I N P U T    D R I V E R            *
69                   /*                                                   *
70                   /****************************************************
71                   /
72                   /
73                   /   THIS DRIVER PERFORMS FUNCTIONS REQUIRED TO RECEIVE
74                   /   MESSAGES FROM SC. ONE BYTE OF DATA IS INPUT AT
75                   /   A TIME AND NOT UNTIL 4 BYTES ARE RCV'D IS THE
76                   /   MESSAGE VERIFIED.
77                   /
78                   /
79                   /   MESG RCV'D FROM SC
80                   /   IF THE MESG IS UNRECOGNIZABLE,
81                   /       INPUT MORE BYTES FOR MESG SYNC UP,
82                   /   ELSE,
83                   /       XMIT VALID MESG TO XSS OUTPUT BUFFER.
84                   /
85                   /
86          001234 URCVR:
87  234 072 011603           LDA     URCNT    /# BYTES RCV'D
88                   /
89                   / CHECK WHETHER ENOUGH BYTES RCV'D(MORE THAN 3 BYTES AT LEAST)
90                   /
91  237 376 004              CPI     URBYT    /# BYTES/MESG
92  241 330                  RC               /NOT ENOUGH BYTES TO PROCESS
93                   /
94                   / MORE THAN 3 BYTES RCV'D, PROCESS AND XFER TO XSS OUTPUT
95                   / BUFFER, IF THIS IS VALID MESG.
96                   /
97  242 052 010006 URGET:    LHLD    URLST    /SC I/P NEXT-OUT POINTER
98  245 001 000000           LXI     B,0      /C REG=LOOP COUNT
99  250 353         URLOP:   XCHG             /DE=NEXT-OUT POINTER
00                   /
01                   / REMOVE MESG FROM SC I/P BUFFER ,CHECK OVERFLOW AND
02                   / STORE REMOVED MESG INTO TEMP BUFFER
03  251 041 010450           LXI     H,UREND  /ENDING ADR OF SC I/P BUF
04  254 315 001656           CALL    COMPR    /** COMPARE END OF BUF SR **
05  257 332 001265           JC      URAPE    /NOT OVERFLOW
06                   / OVERFLOW, REINITIALIZE NEXT-OUT POINTER
07  262 052 000064           LHLD    URSTT    /STARTING ADR OF SC I/P BUF
08  265 042 010006 URAPE:    SHLD    URLST    /UPDATED NEXT-OUT POINTER
09                   / IF THIS IS 1ST BYTE OF MESG, STORE NEXT-OUT POINTER TEMP
10  270 171                  MOV     A,C      /LOOP COUNT
11  271 247                  ANA     A
12  272 302 001300           JNZ     URPAS    /NOT THE 1ST BYTE
13                   / 1ST BYTE, TEMP SAVE NEXT-OUT POINTER
14  275 042 010024           SHLD    URTP1
15
16  300 021 010030 URPAS:    LXI     D,URAUX  /SC I/P AUXILLIARY BUF
17  303 176                  MOV     A,M      /FETCH SC I/P MESG BYTE
18                   / SAVE FETCHED DATA BYTE IN THE AUX BUF TEMP FOR PARITY CHECK
19                   /
20  304 353                  XCHG
21  305 011                  DAD     B        /UPDATE AUX BUF POINTER
22  306 167                  MOV     M,A      /SAVE IN AUX BUF
23  307 353                  XCHG             /RESTORE SC NEXT-OUT POINTER
24  310 043                  INX     H        /NEXT DATA BYTE IN SC I/P BUF
25  311 014                  INR     C        /INCREMENT LOOP COUNT
26                   / CHECK 4 DATA BYTES REMOVED FROM SC I/P BUFFER
27  312 171                  MOV     A,C
28  313 376 004              CPI     URBYT
29  315 302 001250           JNZ     URLOP    /NOT DONE
30
31                   / DONE, CHECK THE PARITY OF REMOVED MESG IN ORDER TO FORM
32                   / VALID MESG TO SEND TO XSS O/P BUFFER
33                   /
```

```
34 320 042 010026           SHLD    URTP2    ;TEMP SAVE CURRENT NEXT-OUT POINTER
35 323 041 010031           LXI     H,URAUX+1 ;AUX BUFFER
36 326 076 003              MVI     A,URBYT-1 ;# DATA BYTES/MESG
37 330 315 001601           CALL    PTYCK    ;** PARITY CHECK SR **
38 333 041 011603           LXI     H,URCNT ;SC I/P MESG BYTE COUNT
39 336 176                  MOV     A,M
40                   ; CARRY SET, INVALID MESG, OTHERWISE, VALID
41 337 322 001354           JNC     URVAL    ;VALID MESG
42                   ;
43
44                   ; INVALID MESG, LOOP BACK AND FORM ANOTHER 4 BYTES MESG
45 342 065                  DCR     M        ;DECREMENT BYTE COUNT
46 343 052 010024           LHLD    URTP1    ;LAST NEXT-OUT POINTER
47 346 042 010026           SHLD    URLST    ;UPDATE
48 351 303 001234           JMP     URCVR    ;LOOP BACK
49
50                   ;
51                   ; VALID MESG RCV'D, UPDATE NEXT-OUT POINTER AND # BYTES RCV'D COUNT
52                   ;
53 354 326 004     URVAL:   SUI     4
54 356 167                  MOV     M,A      ;UPDATE # BYTES COUNT
55 357 052 010026           LHLD    URTP2    ;CURRENT NEXT-OUT POINTER
56 362 042 010006           SHLD    URLST    ;UPDATE
57                   ;
58                   ; CHECK THERE IS ENOUGH ROOM IN XSS O/P BUFFER, IF SO,
59                   ; MOVE VALID MESG INTO XSS O/P BUFFER
60                   ;
61 365 072 011630 URBAK:    LDA     UCCNT    ;XSS O/P MESG COUNT(4 BYTES/MESG)
62 370 074                  INR     A        ;INCREMENT MESG COUNT
63 371 376 020              CPI     UCMSG    ;# MESG ALLOWED IN XSS O/P BUF
64 373 322 001447           JNC     UGWAT    ;NO ROOM, WAIT IN THE SYSTEM
65                   ;
66                   ; SPACE AVAILABLE, XFER SC I/P MESG INTO XSS O/P BUFFER
67                   ; (VERIFY THE CONDITION OF OVERFLOW IN XSS O/P BUFFER)
68                   ;
69 376 052 010010           LHLD    UCFST    ;XSS O/P NEXT-IN POINTER
70 401 001 010030           LXI     B,URAUX  ;SC I/P MESG
71 404 026 004              MVI     D,4      ;BYTE COUNT
72 406 325       URXFR:     PUSH    D        ;SAVE BYTE COUNT
73 407 012                  LDAX    B        ;FETCH SC I/P BYTE
74 410 167                  MOV     M,A      ;SAVE IN XSS O/P BUFFER
75 411 043                  INX     H        ;INCREMENT NEXT-OUT POINTER
76 412 003                  INX     B        ;INCREMENT NEXT-IN POINTER
77 413 353                  XCHG
78 414 041 010350           LXI     H,UCEND  ;ENDING ADR OF XSS O/P BUF
79 417 315 001656           CALL    COMPR    ;** COMPARE END OF BUF SR **
80 422 332 001430           JC      URUPT    ;NOT OVERFLOW
81                   ; OVERFLOW, REINITIALIZE NEXT-IN POINTER
82 425 052 000062           LHLD    UCSTT    ;END OF BUF, RESET
83 430 042 010010 URUPT:    SHLD    UCFST    ;UPDATE XSS O/P NEXT-IN POINTER
84                   ;
85                   ; CHECK FINISHED TO XFER MESG
86 433 321                  POP     D        ;BYTE COUNT
87 434 025                  DCR     D
88 435 302 001406           JNZ     URXFR    ;NOT DONE YET
89                   ;
90                   ; FINISHED TO XFER, UPDATE XSS O/P MESG COUNT AND NEXT-IN POINTER
91                   ;
92 440 041 011630           LXI     H,UCCNT  ;XSS O/P MESG COUNT
93 443 064                  INR     M
94                   ;
95                   ; LOOP BACK, AND CHECK THERE ARE ENOUGH BYTES LEFT TO PROCESS
96                   ;
97 444 303 001234           JMP     URCVR
98
99                   ; WAIT UNTIL XSS CLEAR OUT ITS BUFFER
00                   ;
01 447 315 000454 UGWAT:    CALL    URWAT
02 452 303 001365           JMP     URBAK
03         000000           NPG
04                   ;
```

```
05      /************************************************
06      /*                                                *
07      /*         S C   O U T P U T   D R I V E R        *
08      /*                                                *
09      /************************************************
10      ;
11      ;
12      ;       THIS DRIVER PERFORMS THE OUTPUT OF 4 BYTE MESG/RE-XMIT
13      ;       REQUEST TO THE SYSTEM CONTROLLER.
14      ;
15           001455 UXMIT: EQU     $
16      455 072 011556         LDA     UXCNT   ;# MESG TO SEND
17      460 247                ANA     A
18      461 310                RZ              ;NONE TO SEND, RETURN
19      ;
20      ;       MESG TO SEND TO SC, IF TRANSMITTER IS READY
21      ;
22      462 315 001534         CALL    UXSTA   ;** CHECK SC O/P STATUS SR **
23      465 052 010002         LHLD    UXLST   ;HL=POINTER OF LAST PROCESSED MESG
24      470 076 004            MVI     A,UXBYT ;# BYTES/MESG
25      472 365         UXLOP: PUSH    PSW     ;SAVE # BYTES/MESG COUNT
26      473 176                MOV     A,M
27      474 323 010            OUT     UTOUT   ;OUTPUT CHARACTER
28      476 043                INX     H       ;NEXT BYTE
29      477 315 001534         CALL    UXSTA   ;** CHECK SC O/P STATUS SR **
30      502 361                POP     PSW
31      503 075                DCR     A       ;DECREMENT # BYTES/MESG
32      504 302 001472         JNZ     UXLOP   ;NOT DONE, LOOP
33      ;
34      ;       DONE TO XMIT THIS MESG, UPDATE POINTER OF MESG IN THE BUFFER
35      ;
36      507 353                XCHG            ;HL=POINTER OF LAST PROCESSED MESG
37      510 041 011520         LXI     H,UXEND ;HL=ENDING ADR OF THE BUFFER
38      513 315 001656         CALL    COMPR   ;** COMPARE END ADR OF THE BUFFER SR *
39      516 332 001524         JC      UXSTO   ;NOT END OF BUFFER
40      ;       END OF BUFFER, RESET POINTER TO STARTING ADR OF BUFFER
41      ;
42      521 052 000066         LHLD    UXSTT   ;HL=STARTING ADR OF THE BUFFER
43      524 042 010002 UXSTO:  SHLD    UXLST   ;UPDATE POINTER
44      527 041 011556         LXI     H,UXCNT ;# MESG TO SEND COUNTER
45      532 065                DCR     M
46      ;
47      ;       RETURN
48      ;
49      533 311                RET
50      ;
51      ;
52      ;
53      /*--------------------------------------------------------
54      ;       SYSTEM CONTROLLER OUTPUT STATUS
55      ;
56      ;
57           001534 UXSTA: EQU     $
58      534 345                PUSH    H
59      535 076 050            MVI     A,UXTMO
60      537 062 010037         STA     UXTMR   ;SET A CLOCK
61      542 333 011     UXST1: IN      UTSTA   ;INPUT SC O/P XMIT STATUS
62      ;       CHECK WHETHER PORT 11 I/P HIGH, IF SO, RESTART
63      544 107                MOV     B,A     ;TEMP SAVE STATUS
64      545 346 200            ANI     BIT7    ;P11I7=H BIT
65      547 312 001556         JZ      UXCHK   ;NOT SET, CHECK XMITTER READY
66      ;       P11I7=H SET, RESTART THE WHOLE PROG(PORT 11 PULLED)
67      552 363                DI
68      553 303 000000         JMP     PROMS   ;RESTART
69      ;
70      556 170         UXCHK: MOV     A,B     ;RESTORE STATUS BYTE
71      557 346 002            ANI     BIT1    ;ISOLATE XMTR READY BIT
72      561 302 001572         JNZ     UXRET   ;READY, RETURN
73      ;       NOT READY, WAIT IN THE SYSTEM
74      564 315 000477         CALL    UXWAT
75      567 303 001542         JMP     UXST1   ;CHECK AGAIN
76      ;
77      ;       READY, RETURN
78      ;
```

```
 79            001572 UXRET: EQU    S
 80  572 076 377       MVI    A,377Q
 81  574 062 010037    STA    UXTMR   ;DISABLE THE TIMER
 82  577 341           POP    H
 83  600 311           RET
 84        000000      NPG
 85                 ;
 86                 ;*************************************************
 87                 ;*                                               *
 88                 ;*   C H E C K S U M / P A R I T Y   S U B R O U T I N E   *
 89                 ;*                                               *
 90                 ;*************************************************
 91                 ;
 92                 ;  THIS SR VERIFIES CHECKSUM IN EVERY DATA BYTE EXCEPT
 93                 ;  THE LAST BYTE WHICH WILL BE CHECKED BY PARITY
 94                 ;  IF ANY ERROR IS DETECTED, CARRY WILL BE SET TO INFORM
 95                 ;  THE CALLER.
 96                 ;
 97                 ;  ENTRY: (HL)=POINTER OF SUPPLIED BUFFER
 98                 ;         (A) =# DATA BYTES
 99                 ;
 00                 ;
 01           001601 PTYCK: EQU    S
 02  601 365          PUSH   PSW     ;TEMP SAVE # DATA BYTES
 03  602 345          PUSH   H       ;TEMP SAVE POINTER OF USER'S BUF
 04  603 137          MOV    E,A     ;(E)=# DATA BYTES
 05  604 176   PTY10: MOV    A,M     ;1ST DATA BYTE
 06  605 001 000007   LXI    B,7     ;(C)=BIT COUNT,(B)=PARITY CHECK
 07                 ;
 08                 ;  FIGURE OUT CHECK SUM OF BYTE 1 THRU N(BITS 6-0)
 09                 ;
 10  610 017   PTY20: RRC
 11  611 322 001615   JNC    PTY30
 12  614 004          INR    B       ;RECORD # 1'S
 13  615 015   PTY30: DCR    C       ;BIT COUNT
 14  616 302 001610   JNZ    PTY20   ;NOT DONE
 15                 ;
 16                 ;  DETERMINE WHETHER CORRECT CHECK SUM RCV'D, IF NOT, SET CARRY
 17                 ;
 18  621 170          MOV    A,B
 19  622 017          RRC
 20  623 346 200      ANI    BIT7    ;ISOLATE CHECKSUM
 21  625 127          MOV    D,A     ;TEMP SAVE
 22  626 176          MOV    A,M
 23  627 346 200      ANI    BIT7    ;ISOLATE RCV'D CHECKSUM
 24  631 272          CMP    D       ;DETERMINE CHECKSUM CORRECT
 25  632 067   PTY40: STC
 26  633 300          RNZ            ;ERROR, RETURN WITH CARRY
 27                 ;
 28                 ;  DETERMINE THE REST OF DATA BYTES
 29                 ;
 30  634 035          DCR    E       ;(E)=BYTE COUNT
 31  635 043          INX    H       ;NEXT BYTE
 32  636 302 001604   JNZ    PTY10   ;NOT DONE
 33                 ;
 34                 ;  FIGURE OUT VALID PARITY BYTE
 35                 ;
 36  641 341          POP    H       ;RESTORE POINTER OF USER'S BUFFER
 37  642 301          POP    B       ;RESTORE # DATA BYTES
 38  643 176          MOV    A,M
 39  644 256   PTY50: XRA    M
 40  645 005          DCR    B
 41  646 302 001644   JNZ    PTY50
 42  651 247          ANA    A
 43  652 302 001632   JNZ    PTY40   ;PARITY BYTE NOT CHECK, ERROR
 44                 ;
 45                 ;  CHECKSUM/PARITY OK, RETURN WITHOUT CARRY SET
 46                 ;
 47  655 311          RET
 48        000000     NPG
 49                 ;
 50                 ;
```

```
51          ;;;;;;;;;;;;;;;;;;;;;;;;;;;;;;;;;;;;;;;;;;;;;;;;;;;;;;;;;
52          ;;                                                       ;;
53          ;;      C O M P A R E   S U B R O U T I N E              ;;
54          ;;                                                       ;;
55          ;;;;;;;;;;;;;;;;;;;;;;;;;;;;;;;;;;;;;;;;;;;;;;;;;;;;;;;;;
56          ;
57          ;;      THE COMPARE SUBROUTINE COMPARES TWO BYTES IN REGISTER
58          ;;      D,E TO TWO BYTES IN REGISTER H,L. CONDITION CODES ARE
59          ;;      RETURNED ACCORDING TO THE RESULT OF THE COMPARISON.
60          ;;      (I.E.  D,E TO H,L)
61          ;;
62          ;;      EXIT:HL=ENTERED DE
63          ;;
64  666 172        COMPR: MOV   A,D
65  667 274               CMP   H
66  660 302 001665        JNZ   COM10   ;SWITCH DE TO HL AND RETURN
67  663 173               MOV   A,E
68  664 275               CMP   L
69  665 353        COM10: XCHG          ;HL=ENTERED DE
70  666 311               RET
71      000000            NPG
72          ;
73          ;
74          ;*********************************************************
75          ;*                                                       *
76          ;*      C L E A R   S U B R O U T I N E                  *
77          ;*                                                       *
78          ;*********************************************************
79          ;
80          ;   THIS SUBROUTINE CLEARS THE STACK/BUFFER.
81          ;
82          ;   ENTRY : HL=STARTING ADDRESS OF THE USER SUPPLIED BUFFER
83          ;           A =# BYTES
84          ;
85          ;   EXIT  : HL=ENTERED HL - 2
86          ;
87          ;   NOTE:THIS SR CLEARS THE MEMORY BACKWARD.
88          ;
89  667 345        CLEAR: PUSH  H       ;SAVE SUPPLIED HL
90  670 137               MOV   E,A     ;# BYTES
91  671 257        CLRLP: XRA   A
92  672 167               MOV   M,A     ;CLEAR THE MEMORY
93  673 053               DCX   H       ;NEXT LOCATION
94  674 035               DCR   E       ;BYTE COUNT
95  675 302 001671        JNZ   CLRLP   ;NOT DONE
96          ;
97          ; DONE, UPDATE HL AND RETURN
98          ;
99  700 341               POP   H       ;RESTORE ENTERED HL
00  701 053               DCX   H       ;DECREMENT HL
01  702 053               DCX   H
02  703 311               RET
03          ;
04          ;;
05          ;
06      001704 PROME: EQU  $
07      000000        NPG
******
******
****** MAIN= 1208  010000  >UD>STEVE>CP1
******
08      010000         ORG   RAM     ;(TEMP CODE)
09          ;
10          ;
11      010200 RAMST: EQU  $
12          ;
13          ;
14          ;
15      020001 BIT0: EQU   1Q
16      020002 BIT1: EQU   2Q
17      020004 BIT2: EQU   4Q
18      020010 BIT3: EQU   10Q
19      020020 BIT4: EQU   20Q
20      020040 BIT5: EQU   40Q
21      020100 BIT6: EQU   100Q
```

```
22      000200 BIT7: EQU      2000
23             ;
24             ;
25             ;
26             ;       DEFINE # BYTES PER MESSAGE XMIT/RCV'D
27             ;
28      000004 XSBYT: EQU      4         ;XSS INPUT BUFFER
29      000004 UCBYT: EQU      4         ;XSS OUTPUT BUFFER
30      000004 URBYT: EQU      4         ;SC INPUT BUFFER
31      000004 UXBYT: EQU      4         ;SC OUTPUT BUFFER
32             ;
33             ;
34             ;
35             ;       DEFINE POINTER OF CURRENT/PAST MESG IN THE BUFFERS
36             ;
37 000 000 000000UXFST: DW    0         ;SC OUTPUTMESG(CURRENT)
38 002 000 000000UXLST: DW    0         ;SC OUTPUT MESG(PAST)
39 004 000 000000URFST: DW    0         ;SC INPUT MESG(CURRENT)
40 006 000 000000URLST: DW    0         ;SC INPUT MESG(PAST)
41 010 000 000000UCFST: DW    0         ;XSS OUTPUT MESG(CURRENT)
42 012 000 000000UCLST: DW    0         ;XSS OUTPUT MESG(PAST)
43 014 000 000000XSFST: DW    0         ;XSS INPUT MESG(CURRENT)
44 016 000 000000XSLST: DW    0         ;XSS INPUT MESG(PAST)
45      010020 PNTRE: EQU     $
46             ;
47             ;
48             ;;                                                      ;;
49             ;;;;;;;;;;;;;;;;;;;;;;;;;;;;;;;;;;;;;;;;;;;;;;;;;;;;;;;;
50             ;
51             ;;      TEMPORARY STORAGE
52             ;
53 020 000    SRADD: DB       0         ; SIX BIT SCAN ADDRESS
54 021 000    SRADR: DB       0         ; FOUR BIT SCAN ADDRESS
55 022 000    TICK:  DB       0         ; SET TO ONE WHEN 24 MILLISECOND TICKS
56 023 000    XSSW1: DB       0         ;RCV'D DATA BYTE(XSS I/P)
57 024 000 000000URTP1: DW    0         ;FOR SC I/P DRIVER
58 026 000 000000URTP2: DW    0         ;FOR SC I/P DRIVER
59 030 000 000000URAUX: DW    0         ;AUXILLIARY BUF FOR SC I/P DRIVER
60 032 000 000000         DW  0         ;(4 BYTES)
61             ;;                                                      ;;
62             ;;;;;;;;;;;;;;;;;;;;;;;;;;;;;;;;;;;;;;;;;;;;;;;;;;;;;;;;
63             ;
64             ;
65             ;       TIMERS:
66             ;               >0   CLOCK RUNNING
67             ;               <0   CLOCK DISABLED
68             ;               =0   TIMED-OUT
69             ;
70             ;
71             ;
72      010034 TIMER: EQU     $
73 034 000    SRTMR: DB       0         ; XSS INPUT TIMER
74 035 000    SXTMR: DB       0         ; XSS OUTPUT TIMER
75 036 000    URTMR: DB       0         ; S.C. INPUT TIMER
76 037 000    UXTMR: DB       0         ; S.C. OUTPUT TIMER
77             ;;                                                      ;;
78             ;;;;;;;;;;;;;;;;;;;;;;;;;;;;;;;;;;;;;;;;;;;;;;;;;;;;;;;;
79             ;
80             ;;      CONTAINS ADDRESS OF STACK POINTERS
81             ;
82 040 000 000000TSTK1: DW    0
83 042 000 000000TSTK2: DW    0
84 044 000 000000TSTK3: DW    0
85 046 000 000000TSTK4: DW    0
86             ;;                                                      ;;
87             ;
88             ;
89             ;
90             ;       DEFINE THE CIRCULAR BUFFERS
91             ;
92      010050 XSBUF: EQU     $
******
******
****** MAIN= 1093    010250    >UD>STEVE>CP1
******
```

```
 93      010250            ORG     XSBUF+128
 94      010250 XSEND: EQU          $
 95      010250 UCBUF: EQU          $
******
******
****** MAIN- 1096   010350   >UD>STEVE>CP1
******
 96      010350            ORG     UCBUF+64
 97      010350 UCEND: EQU          $
 98      010350 URBUF: EQU          $
 99      010450            ORG     URBUF+64
100      010450 UREND: EQU          $
101      010450 UXBUF: EQU          $
******
******
****** MAIN- 1102   011520   >UD>STEVE>CP1
******
 02      011520            ORG     UXBUF+552
 03      011520 UXEND: EQU          $
 04              ;;
 05              ;;;;;;;;;;;;;;;;;;;;;;;;;;;;;;;;;;;;;;;;;;;;;;;;;;;;;;;;;;;
 06              ;;
 07              ;;       DEFINE THE SYSTEM STACKS
 08              ;;
******
******
****** MAIN- 1109   011556   >UD>STEVE>CP1
******
 09      011556            ORG     UXEND+ST4SZ       ;SC OUTPUT STACK
 10      011556 STK4   EQU          $
 11 556 000      UXCNT: DB          0      ;SC OUTPUT MESG COUNT
******
******
****** MAIN- 1112   011603   >UD>STEVE>CP1
******
 12      011603            ORG     STK4+ST3SZ+1      ;SC INPUT STACK
 13      011603 STK3   EQU          $
 14 603 000      URCNT: DB          0      ;SC INPUT MESG COUNT
******
******
****** MAIN- 1115   011630   >UD>STEVE>CP1
******
 15      011630            ORG     STK3+ST2SZ+1      ;XSS OUTPUT STACK
 16      011630 STK2   EQU          $
 17 630 000      UCCNT: DB          0      ;XSS OUTPUT MESG COUNT
******
******
****** MAIN- 1118   011673   >UD>STEVE>CP1
******
 18      011673            ORG     STK2+ST1SZ+1      ;XSS INPUT STACK
 19      011673 STK1   EQU          $
 20 673 000      XSCNT: DB          0      ;XSS INPUT MESG COUNT
******
******
****** MAIN- 1121   011720   >UD>STEVE>CP1
******
 21      011720            ORG     STK1+STPSZ+1      ;PRIMARY STACK
 22      011720 PSTK:  EQU          $
 23              ;
 24              ;
 25              ;
 26      011720 RAME:  EQU          $
 27      000747 FILLZ: EQU          (RAME-RAMST-1)/2          ;
 28              ;
 29              ;
 30              ;
 31              ;     DEFINE # MESSGAES PER BUFFER
 32              ;
 33      000040 XSMSG: EQU          (XSEND-XSBUF)/XSBYT     ;XSS INPUT BUFFER
 34      000020 UCMSG: EQU          (UCEND-UCBUF)/UCBYT     ;XSS OUTPUT BUFFER
 35      000020 URMSG: EQU          (UREND-URBUF)/URBYT     ;SC INPUT BUFFER
 36      000212 UXMSG: EQU          (UXEND-UXBUF)/UXBYT     ;SC OUTPUT BUFFER
 37              ;
 38              ;
 39              ;
 40              ;
 41              ;
```

```
42      001704  PROMZ1  EQU     PROME-PROMS     ;SIZE OF USED PROM
43      001723  RAMZ1   EQU     RAME-RAMST      ;SIZE OF USED RAM
44                      ;
45                      ;
46      000000          END
```

SYMBOL TABLE LISTING

```
BIT0    000001   BIT1    000002   BIT2    000004   BIT3    000010
BIT4    000020   BIT5    000040   BIT6    000100   BIT7    000200
CCONT   000201   CLEAR   001667   CLOOP   000170   CLRLP   001671
COM10   001666   COMPR   001656   FILLZ   000747   LOOP    000040
PNTRE   010020   PROGS   000153   PROM    000000   PROME   001704
PROMS   000000   PROMZ   001704   PSTK    011720   PTY10   001604
PTY20   001610   PTY30   001615   PTY40   001632   PTY50   001644
PTYCK   001601   RAM     010000   RAME    011720   RAMST   010000
RAMZ    001720   RDADR   000003   RDAT0   000002   RDAT1   000003
RDAT2   000004   REDBY   000010   RSHFT   000005   RSTAT   000000
SC2     000244   SC3     000300   SC4     000336   SCLOK   000206
SCNBY   000004   SDONE   000372   SMLOP   001001   SMOD1   001026
SMOD2   001046   SMOVE   000757   SNADR   000002   SNDAT   000001
SOK     001112   SRADD   010020   SRADR   010021   SRCHK   000735
SRCON   000710   SRCOT   000677   SRCVR   000514   SREDY   000527
SRERR   000753   SRLOD   000602   SRLOO   000565   SRLOP   000533
SRMAN   000516   SRNON   000706   SRSAV   000770   SRSET   000770
SRSTA   001070   SRTMR   010034   SRTSN   000001   SRWAT   000406
ST1SZ   000042   ST2SZ   000024   ST3SZ   000024   ST4SZ   000036
START   000154   STCLK   000143   STINT   000070   STK1    011673
STK2    011630   STK3    011603   STK4    011556   STLP1   001075
STPSZ   000024   STPTR   000125   STRET   000150   STXLIM  001173
SXMTR   001117   SXOK    001225   SXSTA   001203   SXTLP   001211
SXTMO   000050   SXTMR   010035   SXWAT   000431   TCNT    000004
TICK    010022   TIMER   010034   TSCAN   000050   TSTK1   010040
TSTK2   010042   TSTK3   010044   TSTK4   010046   UCBUF   010250
UCBYT   000004   UCCNT   011630   UCEND   010350   UCFST   010010
UCLST   010012   UCMSG   000020   UCSTT   000062   UGWAT   001447
URAPE   001265   URAUX   010030   URBAK   001365   URBUF   010350
URBYT   000004   URCNT   011603   URCVR   001234   UREND   010450
UREST   000013   URFST   010004   URGET   001242   URLOP   001250
URLST   010006   URMSG   000020   URPAS   001300   URSTT   000064
URTMR   010036   URTP1   010024   URTP2   010026   URUPT   001430
URVAL   001354   URWAT   000454   URXFR   001406   UTAUX   000012
UTAXI   000012   UTINN   000010   UTMRR   000011   UTOUT   000010
UTSTA   000011   UXBUF   010450   UXBYT   000004   UXCHK   001556
UXCNT   011556   UXEND   011520   UXFST   010000   UXLOP   001472
UXLST   010002   UXMIT   001455   UXMSG   000212   UXRET   001572
UXST1   001542   UXSTA   001534   UXSTO   001524   UXSTT   000066
UXTMO   000050   UXTMR   010037   UXWAT   000477   XCADR   000007
XDAT0   000006   XDAT1   000005   XDAT2   000004   XMTBY   000001
XMTPY   000002   XSBUF   010050   XSBYT   000004   XSCNT   011673
XSEND   010250   XSFST   010014   XSLST   010016   XSMSG   000040
XSSTT   000060   XSSW1   010023   XSTRT   000000   ZERO    000015
```

What is claimed is:

1. In a telephone system operating in a multiframe format consisting of a plurality of time frames where each frame consists of a plurality of time slots having a time slot rate and a framing bit and where said plurality of frames includes signaling frames having supervisory signals where the supervisory signals occur as a signaling bit during each time slot in the signaling frame, said system including a base switch connected to a plurality of multitime slot data buses having time frames corresponding to said multiframe format and including a subscriber switch connected to a pair of said buses and to a plurality of local subscriber lines to specified time slots on said pair of buses, said base switch including communication apparatus comprising:

buffer means for receiving and sending signaling bits on said plurality of multitime slot buses, channel selector means for specifying said pair of buses, multiplexer means connected to said buffer means for selecting the signaling time slots on one of said pair of buses in alternate frames of said signaling frames, receiver means for receiving in said alternate signaling frames sequential signaling bits in the form of a first message from said multiplexer means, transmitter means connected to said multiplexer means for transmitting in said alternate signaling frames sequential signaling bits in the form of a second message to one of said pair of buses, and processing means for controlling the operation of the apparatus.

2. The apparatus of claim 1 wherein said transmitter means includes message register means for storing a message to be transmitted from said processing means and write decode means for writing the message into said message register means.

3. The apparatus of claim 2 further including decoder means for enabling the connection of said message register means to said selected one of said buses and address register means for storing an address corresponding to said selected one of said buses for addressing said decoder means thereby enabling the connection of said message to said selected bus.

4. The apparatus of claim 3 further including busy register means for storing a busy bit for indicating a message is being transmitted.

5. The apparatus of claim 4 further including means for resetting said busy bit when said message has been transmitted.

6. The apparatus of claim 1 wherein said receiver means includes message detect memory means for storing a message bit from the first time slot from each of said buses where the state of said message bit indicates the presence or absence of a message on said buses and means for reading said message detect memory means for informing said processor means of the presence of a message on said buses.

7. The apparatus of claim 6 further including message memory means for storing a message received from one of said buses and means for reading said message memory means for connecting the message of said processor means.

8. The apparatus of claim 7 further including write controller means for writing the message and the message bits into said memory means.

9. The apparatus of claim 8 further including overrun means for storing the presence of a message bit from another of said buses.

10. The apparatus of claim 8 further including scan address register means for storing a scan address for scanning said message detect memory means, a scan busy register for storing a scanning bit for indicating scanning of said message detect memory means, and means for resetting said scan busy register when scanning is completed.

11. The apparatus of claim 8 further including receive address register means for storing an address for reading said message memory means at the location where the message is stored.

12. The apparatus of claim 11 further including a read busy register for storing a read busy bit for indicating the reading of said message memory means and means for resetting said read busy bit when the message is read out of said message memory means.

13. In a telephone system operating in a multiframe format consisting of a plurality of time frames where each frame consists of a plurality of time slots having a time slot rate and a framing bit and where said plurality of frames include signaling frames having supervisory signals where the supervisory signals occur as a signaling bit during each time slot in a signaling frame, said system including a base switch connected to a plurality of multitime slot buses having time frames corresponding to the multitime frame format and including a subscriber switch connected to a pair of said buses and to a plurality of local subscriber lines for connecting said local subscriber lines to specified time slots on said pair of buses, said base switch including communication processor apparatus comprising:

buffer means connected to receive said signaling bits during said signal frames, multiplexer means connected to said buffer means for selecting in alternate signaling frames sequential signaling bits in the form of a message on one of said buses from said subscriber switch, channel selector means connected to said multiplexer means for specifying selected ones of said buses for enabling said multiplexer means to receive signaling bits from a specified bus, receiver means connected to said multiplexer means for receiving in said alternate signaling frames message signaling bits, transmitter means connected to said multiplexer means for transmitting in said alternate signaling frames message signaling bits to a specified bus selected by said channel selector means, and processing means for controlling the operating of said apparatus.

14. The apparatus of claim 13 wherein said transmitter means includes store means for storing a message to be transmitted from said processing means, address register means for storing an address corresponding to the selected one of said buses, decoder means addressable by said register means for enabling the switching of said message to said specified bus, and selector means for switching said message to said bus.

15. The apparatus of claim 13 wherein said receiver means includes message memory means for storing the message from said subscriber switch, message detect memory means for storing a flag bit indicating that a message is on one of said buses, flag store means for storing said flag bit for informing said processing means of said message, and register means connected to said message memory means for shifting said message to said processing means.

16. In a telephone system operating in a multiframe format consisting of a plurality of time frames where each frame consists of a plurality of time slots having a time slot rate and a framing bit and where said plurality of frames include signaling frames having supervisory signals where the supervisory signals occur as a signaling bit during each time slot in a signaling frame, said system connected to a plurality of multitime slot buses having time frames corresponding to the multitime frame format for switching data between the time slots on any of said buses, communication processor apparatus comprising:

buffer means for receiving and sending signaling bits on said plurality of multitime slot buses, channel selector means for specifying selected ones of said buses, multiplexer means connected to said buffer means for selecting sequential signaling bits on one of said selected buses in alternate frames of said signaling frames, receiver means for receiving said sequential signaling bits in the form of a first message from said multiplexer means, transmitter means connected to said multiplexer means for transmitting sequential signaling bits in the form of a second message to a selected one of said buses, and processing means for controlling the operation of the apparatus.

17. In a telephone system operating in a multiframe format consisting of a plurality of time frames where each frame consists of a plurality of time slots having a time slot rate and a framing bit, said system including a base switch connected to a plurality of multitime slot buses having time frames corresponding to a multiframe format and including a subscriber switch connected to a pair of said buses and to a plurality of local subscriber lines for connecting said local subscriber lines to specified time slots on said pair of buses, said base switch including communication processor apparatus comprising:

buffer means for receiving and sending said framing bits on said plurality of multitime slot buses, channel selector means for specifying said pair of buses, multiplexer means connected to said buffer means for selecting sequential framing bits on one of said pair of buses, receiver means for receiving said sequential framing bits in the form of a first message from said multiplexer means, transmitter means connected to said multiplexer means for transmitting sequential framing bits in the form of a second message to one of said pair of buses, and processing means for controlling the operation of the apparatus.

18. In a telephone system operating in a multiframe format consisting of a plurality of time frames where each time frame includes a plurality of time slots and where said plurality of time frames includes signaling frames having supervisory signals where the supervisory signals occur as a signaling bit during each time slot in the signaling frame, said system including a base switch connected to a plurality of multitime slot data buses having time frames corresponding to the multiframe format, said base switch including communication apparatus comprising:

buffer means connected to said plurality of data buses for sending and receiving signaling bits on said plurality of multitime slot buses, selector means for specifying a selected one of said plurality of buses, multiplexer means connected to said buffer means for selecting in alternate signaling frames the signaling time slots on said specified bus, transmitter means connected to said multiplexer means for transmitting in alternate signaling frames sequential signaling bits in the form of a first message to said selected bus, receiver means for receiving in alternate signaling frames sequential signaling bits in the form of a second message from said multiplexer means, and processing means for controlling the operation of the apparatus.

* * * * *